(12) United States Patent
Zoitos et al.

(10) Patent No.: US 12,132,193 B2
(45) Date of Patent: *Oct. 29, 2024

(54) SILICON-BASED ANODE MATERIAL FOR LITHIUM ION BATTERY

(71) Applicant: UNIFRAX I LLC, Tonawanda, NY (US)

(72) Inventors: Bruce K. Zoitos, Williamsville, NY (US); Adam Kelsall, Williamsville, NY (US); Jonathan Cross, Clarence Center, NY (US); Chad Cannan, Spring, TX (US)

(*) Notice: Subject to any disclaimer, the term of this patent is extended or adjusted under 35 U.S.C. 154(b) by 9 days.

This patent is subject to a terminal disclaimer.

(21) Appl. No.: 18/189,617

(22) Filed: Mar. 24, 2023

(65) Prior Publication Data
US 2023/0253544 A1 Aug. 10, 2023

Related U.S. Application Data

(60) Division of application No. 17/366,479, filed on Jul. 2, 2021, now Pat. No. 11,652,201, which is a
(Continued)

(51) Int. Cl.
*H01M 4/131* (2010.01)
*H01M 4/36* (2006.01)
(Continued)

(52) U.S. Cl.
CPC .......... *H01M 4/131* (2013.01); *H01M 4/364* (2013.01); *H01M 4/483* (2013.01); *H01M 4/485* (2013.01);
(Continued)

(58) Field of Classification Search
CPC .... H01M 4/131; H01M 10/0525; H01M 4/36; H01M 4/48; H01M 4/505; H01M 4/525;
(Continued)

(56) References Cited

U.S. PATENT DOCUMENTS

| 2,215,039 A | 3/1934 | Hood et al. |
| 2,221,709 A | 1/1938 | Hood et al. |

(Continued)

FOREIGN PATENT DOCUMENTS

| CN | 101442124 B | 9/2011 |
| CN | 103326023 A | 9/2013 |

(Continued)

OTHER PUBLICATIONS

Zuo et al., Silicon based lithium-ion battery anodes: A chronicle perspective review, Nano Energy, vol. 31, Jan. 2, 2017 (Year: 2017).*

(Continued)

*Primary Examiner* — Alexander Usyatinsky
(74) *Attorney, Agent, or Firm* — Haynes and Boone, LLP; Michael J. Tobin; Randall C. Brown

(57) ABSTRACT

A porous reduced silica fiber material has a diameter of about 0.1 to about 20 microns and a surface area of about 5 $m^2/g$ to about 400 $m^2/g$. The porous reduced fiber material may be used to form an electrode having a high capacity and improved cycle life over comparable commercial silicon electrodes.

18 Claims, 20 Drawing Sheets

Related U.S. Application Data continuation of application No. 16/130,778, filed on Sep. 13, 2018, now Pat. No. 11,069,885.

(60) Provisional application No. 62/558,107, filed on Sep. 13, 2017.

(51) Int. Cl.
| | |
|---|---|
| *H01M 4/48* | (2010.01) |
| *H01M 4/485* | (2010.01) |
| *H01M 4/505* | (2010.01) |
| *H01M 4/525* | (2010.01) |
| *H01M 4/58* | (2010.01) |
| *H01M 10/0525* | (2010.01) |
| *H01M 4/02* | (2006.01) |
| *H01M 4/62* | (2006.01) |
| *H01M 4/86* | (2006.01) |

(52) U.S. Cl.
CPC .......... *H01M 4/505* (2013.01); *H01M 4/525* (2013.01); *H01M 4/5825* (2013.01); *H01M 10/0525* (2013.01); *H01M 2004/021* (2013.01); *H01M 4/622* (2013.01); *H01M 4/625* (2013.01); *H01M 2004/8684* (2013.01)

(58) Field of Classification Search
CPC ........ H01M 4/62; H01M 4/364; H01M 4/483; H01M 4/485; H01M 4/5825; H01M 4/625; H01M 2004/8684; H01M 2004/021; H01M 4/622
See application file for complete search history.

(56) References Cited

U.S. PATENT DOCUMENTS

| | | | |
|---|---|---|---|
| 2,461,841 A | | 2/1949 | Nordberg |
| 2,491,761 A | | 12/1949 | Parker et al. |
| 2,500,092 A | | 3/1950 | Parker et al. |
| 2,624,658 A | | 1/1953 | Parker et al. |
| 2,635,390 A | | 4/1953 | Parker |
| 2,686,954 A | | 8/1954 | Parker |
| 2,718,461 A | | 9/1955 | Parker et al. |
| 2,730,475 A | | 1/1956 | Parker |
| 4,125,406 A | * | 11/1978 | Sowman ............ C04B 35/62231 501/127 |
| 5,176,857 A | * | 1/1993 | Stacey ............... C04B 35/62236 264/44 |
| 5,888,430 A | | 3/1999 | Wakayama et al. |
| 6,685,906 B2 | | 2/2004 | Fukuoka et al. |
| 6,733,922 B2 | | 5/2004 | Matsubara et al. |
| 6,770,399 B2 | | 8/2004 | Umeno et al. |
| 7,037,581 B2 | | 5/2006 | Aramata et al. |
| 7,718,254 B2 | | 5/2010 | Matsumura et al. |
| 7,790,316 B2 | | 9/2010 | Aramata et al. |
| 7,833,662 B2 | | 11/2010 | Kim et al. |
| 7,964,172 B2 | | 6/2011 | Mukasyan et al. |
| 8,119,288 B2 | | 2/2012 | Zhamu et al. |
| 8,241,793 B2 | | 8/2012 | Zhamu et al. |
| 8,263,265 B2 | | 9/2012 | Mah et al. |
| 8,309,252 B2 | | 11/2012 | Kim et al. |
| 8,388,922 B2 | | 3/2013 | Sotowa et al. |
| 8,475,698 B2 | | 7/2013 | Lytle et al. |
| 8,546,017 B2 | | 10/2013 | Mah et al. |
| 8,580,432 B2 | | 11/2013 | Zhamu et al. |
| 8,617,746 B2 | | 12/2013 | Mah et al. |
| 8,945,774 B2 | | 2/2015 | Coowar et al. |
| 8,962,183 B2 | | 2/2015 | Rayner |
| 8,968,820 B2 | | 3/2015 | Zhamu et al. |
| 9,017,780 B2 | | 4/2015 | Lytle et al. |
| 9,088,045 B2 | | 7/2015 | Park et al. |
| 9,093,693 B2 | | 7/2015 | Zhamu et al. |
| 9,139,441 B2 | | 9/2015 | Anguchamy et al. |
| 9,142,833 B2 | | 9/2015 | Tolbert et al. |
| 9,190,694 B2 | | 11/2015 | Lopez et al. |
| 9,196,896 B2 | | 11/2015 | Jung et al. |
| 9,368,836 B2 | | 6/2016 | Coowar et al. |
| 9,379,368 B2 | | 6/2016 | Roumi |
| 9,466,662 B2 | | 10/2016 | Gardner et al. |
| 9,525,177 B2 | | 12/2016 | Sturgeon et al. |
| 9,537,143 B2 | | 1/2017 | Berrang |
| 9,553,304 B2 | | 1/2017 | Rayner |
| 9,608,272 B2 | | 3/2017 | Loveridge et al. |
| 9,663,860 B2 | | 5/2017 | Yang et al. |
| 9,666,859 B2 | | 5/2017 | Jung et al. |
| 9,666,863 B2 | | 5/2017 | Lu et al. |
| 9,748,573 B2 | | 8/2017 | Yang et al. |
| 9,780,358 B2 | | 10/2017 | Masarapu et al. |
| 9,843,034 B2 | | 12/2017 | Lee et al. |
| 9,843,080 B2 | | 12/2017 | Zhao et al. |
| 9,853,292 B2 | | 12/2017 | Loveridge et al. |
| 9,871,248 B2 | | 1/2018 | Rayner et al. |
| 9,879,344 B2 | | 1/2018 | Lee et al. |
| 9,917,299 B2 | | 3/2018 | Behan et al. |
| 9,947,920 B2 | | 4/2018 | Green |
| 9,947,922 B2 | | 4/2018 | Yoo et al. |
| 9,954,213 B2 | | 4/2018 | Roumi |
| 9,972,836 B2 | | 5/2018 | Yang et al. |
| 9,991,492 B2 | | 6/2018 | Roumi |
| 9,991,509 B2 | | 6/2018 | Yoo et al. |
| 10,003,068 B2 | | 6/2018 | Lopez et al. |
| 10,008,716 B2 | | 6/2018 | Abdelsalam et al. |
| 10,050,275 B2 | | 8/2018 | Loveridge et al. |
| 10,077,506 B2 | | 9/2018 | Friend et al. |
| 10,090,513 B2 | | 10/2018 | Canham et al. |
| 10,158,110 B2 | | 12/2018 | Roumi |
| 10,211,449 B2 | | 2/2019 | Ozkan et al. |
| 10,243,207 B2 | | 3/2019 | Cao et al. |
| 10,290,871 B2 | | 5/2019 | Masarapu et al. |
| 10,297,817 B2 | | 5/2019 | Nishiura et al. |
| 10,355,272 B2 | | 7/2019 | Kim et al. |
| 10,439,206 B2 | | 10/2019 | Behan et al. |
| 10,446,847 B2 | | 10/2019 | Okada et al. |
| 10,490,872 B2 | | 11/2019 | Zhao et al. |
| 10,553,871 B2 | | 2/2020 | Masarapu et al. |
| 10,629,900 B2 | | 4/2020 | Dutta et al. |
| 10,686,183 B2 | | 6/2020 | Masarapu et al. |
| 10,693,117 B2 | | 6/2020 | Roumi |
| 10,797,308 B2 | | 10/2020 | Song et al. |
| 10,818,930 B2 | | 10/2020 | Sturgeon et al. |
| 10,822,713 B2 | | 11/2020 | Friend et al. |
| 10,974,965 B2 | | 4/2021 | Moon et al. |
| 11,069,885 B2 | | 7/2021 | Zoitos et al. |
| 2007/0212538 A1 | * | 9/2007 | Niu ..................... H01M 4/8657 252/502 |
| 2009/0186267 A1 | | 7/2009 | Tiegs |
| 2009/0239151 A1 | | 9/2009 | Nakanishi et al. |
| 2009/0305135 A1 | | 12/2009 | Shi et al. |
| 2010/0301276 A1 | | 12/2010 | Lee et al. |
| 2011/0165468 A1 | | 7/2011 | Alias et al. |
| 2012/0121989 A1 | | 5/2012 | Roberts et al. |
| 2013/0189575 A1 | * | 7/2013 | Anguchamy ......... H01M 4/134 977/948 |
| 2015/0104705 A1 | * | 4/2015 | Canham ................ H01M 4/134 216/13 |
| 2015/0132642 A1 | | 5/2015 | Joo et al. |
| 2015/0280221 A1 | | 10/2015 | Abdelsalam et al. |
| 2016/0204425 A1 | | 7/2016 | Serov et al. |
| 2016/0308205 A1 | * | 10/2016 | Canham ............... H01M 10/054 |
| 2017/0194630 A1 | | 7/2017 | Ozkan et al. |
| 2017/0194631 A1 | | 7/2017 | Favors et al. |
| 2018/0198116 A1 | | 7/2018 | Aurora et al. |
| 2018/0261838 A1 | | 9/2018 | Capiglia et al. |
| 2018/0269471 A1 | | 9/2018 | Lopez et al. |
| 2019/0031516 A1 | | 1/2019 | Gigler |
| 2019/0047215 A1 | | 2/2019 | Ge et al. |
| 2019/0148718 A1 | | 5/2019 | Hatazawa et al. |
| 2019/0207221 A1 | | 7/2019 | Son et al. |
| 2019/0214641 A1 | | 7/2019 | Cao et al. |
| 2019/0326593 A1 | | 10/2019 | Ozkan et al. |
| 2020/0161654 A1 | | 5/2020 | Masarapu et al. |
| 2020/0220170 A1 | | 7/2020 | Dutta et al. |

(56) References Cited

U.S. PATENT DOCUMENTS

| | | | |
|---|---|---|---|
| 2020/0313160 A1 | 10/2020 | Masarapu et al. | |
| 2020/0388811 A1 | 12/2020 | Roumi | |
| 2021/0057737 A1 | 2/2021 | Guo et al. | |

FOREIGN PATENT DOCUMENTS

| | | |
|---|---|---|
| CN | 103392033 A | 11/2013 |
| CN | 102208634 B | 4/2014 |
| CN | 104466185 A | 3/2015 |
| CN | 103165862 B | 10/2015 |
| CN | 105098148 A | 11/2015 |
| CN | 105529451 A | 4/2016 |
| CN | 103346303 B | 5/2016 |
| CN | 105609753 A | 5/2016 |
| CN | 104009235 B | 6/2016 |
| CN | 102969489 B | 8/2016 |
| CN | 106463702 A | 2/2017 |
| CN | 104009211 B | 4/2017 |
| CN | 105140487 B | 5/2017 |
| CN | 107004830 A | 8/2017 |
| CN | 107078273 A | 8/2017 |
| CN | 107354516 A | 11/2017 |
| CN | 107509388 A | 12/2017 |
| CN | 104577045 A | 7/2018 |
| CN | 108598413 A | 9/2018 |
| CN | 106099113 B | 7/2019 |
| CN | 107638868 B | 11/2019 |
| CN | 106941169 B | 12/2019 |
| EP | 0 318 203 A2 | 5/1989 |
| EP | 2 611 732 B1 | 1/2015 |
| EP | 2 915 204 A1 | 9/2015 |
| EP | 2 755 263 B1 | 1/2018 |
| EP | 2 693 533 B1 | 6/2018 |
| GB | 1491205 A | 11/1977 |
| JP | 2003-168426 A | 6/2003 |
| JP | 2003-342019 A | 12/2003 |
| JP | 2004-214054 A | 7/2004 |
| JP | 2005-179086 A | 7/2005 |
| JP | 4061408 B2 | 3/2008 |
| JP | 4099811 B2 | 6/2008 |
| JP | 2008-186732 A | 8/2008 |
| JP | 4130961 B2 | 8/2008 |
| JP | 4604212 B2 | 1/2011 |
| JP | 4756484 B2 | 8/2011 |
| JP | 4925086 B2 | 4/2012 |
| JP | 5051512 B2 | 10/2012 |
| JP | 5369708 B2 | 12/2013 |
| JP | 2014-513385 A | 5/2014 |
| JP | 5576740 B2 | 8/2014 |
| JP | 2015-525189 A | 9/2015 |
| JP | 2016030715 A | 3/2016 |
| KR | 101183937 B1 | 9/2012 |
| KR | 10-2015-0035816 A | 4/2015 |
| RU | 2717780 C1 | 3/2020 |
| TW | 201336156 A | 9/2013 |
| WO | WO 2005/011030 A1 | 2/2005 |
| WO | WO 2008/025188 A1 | 3/2008 |
| WO | WO 2010/035919 A1 | 4/2010 |
| WO | WO 2013/130690 A9 | 9/2013 |
| WO | WO 2013/142287 A1 | 9/2013 |
| WO | WO 2014/068318 A1 | 5/2014 |

OTHER PUBLICATIONS

Banerjee, H. D., et al., "Investigations on the Production of Silicon from Rice Husks by the Magnesium Method", Materials Science and Engineering, 52 (1982) 173-179.
Bourderau, S., et al., "Amorphous Silicon as a Possible Anode Material for Li-Ion Batteries", Journal of Power Sources, 81-82 (1999) 233-236.
Chen, Libao, et al., "Effect of Vinylene Carbonate (VC) as Electrolyte Additive on Electrochemical Performance of Si Film Anode for Lithium Ion Batteries", Journal of Power Sources, 174(2), 538-543, (2007).
Chen, Wei, et al., "Mesoporous Silicon Anodes Prepared by Magnesiothermic Reduction for Lithium Ion Batteries", Journal of the Electrochemical Society, 158 (9) A1055-A1059 (2011).
Cho, Daehwan, et al., "Facile Synthesis of Porous Silicon Nanofibers by Magnesium Reduction for Application in Lithium Ion Batteries", Nanoscale Research Letters (2015) 10:424, DOI 10.1186/s11671-015-1132-8, pp. 1-8.
Choi, Mingu, et al., "Waste Windshield-Derived Silicon/Carbon Nanocomposites as High-Performance Lithium-Ion Battery Anodes", Scientific Reports, (2018) 8:960, DOI:10.1038/s41598-018-19529-1, pp. 1-12.
El Ouatani, L., et al., "The Effect of Vinylene Carbonate Additive on Surface Film Formation on Both Electrodes in Li-Ion Batteries", J. Electrochem. Soc., 156(2) A103-A113 (2009).
Entwistle, Jake, et al., "A review of magnesiothermic reduction of silica to porous silicon for lithium-ion battery applications and beyond", J. Mater. Chem. A, 2018, 6, 18344-18356.
Favors, Zachary, et al., "Towards Scalable Binderless Electrodes: Carbon Coated Silicon Nanofiber Paper via Mg Reduction of Electrospun $SiO_2$ Nanofibers", Scientific Reports, 5 : 8246, DOI: 10.1038/srep08246, pp. 1-7.
Feng, Xuejiao, et al., "Facile approach to $SiO_x/Si/C$ composite anode material from bulk SiO for lithium ion batteries", Phys. Chem. Chem. Phys., 2013, 15, 14420-14426.
Gao, Peibo, et al., "Porous silicon from the magnesiothermic reaction as a high-performance anode material for lithium ion battery applications", Electrochimica Acta 228 (2017) 545-552.
Green, Mino, et al., "Structured Silicon Anodes for Lithium Battery Applications", Electrochemical and Solid-State Letters, 6 (5) (2003) A75-A79.
Harlow, Jessie E., et al., "A Wide Range of Testing Results on an Excellent Lithium-Ion Cell Chemistry to be used as Benchmarks for New Battery Technologies". Journal of the Electrochemical Society, 166 (13) A3031-A3044 (2019).
International Preliminary Report on Patentability issued by the International Bureau of WIPO for International Application No. PCT/US2018/050940, issued Mar. 17, 2020, 8 pages.
International Search Report and Written Opinion received in Patent Cooperation Treaty Application No. PCT/US2018/050940, dated Nov. 15, 2018, 67 pages.
Jia, Haiping, et al., "A Novel Approach to Synthesize Micrometer-Sized Porous Silicon as a High Performance Anode for Lithium-Ion Batteries", Author's Accepted Manuscript, Nano Energy, May 19, 2018, PII: S2211-2855(18)30363-X, DOI: https://doi.org/10.1016/j.nanoen.2018.05.48, Reference: NANOEN2756. (28 pages).
Jung-Keun Yoo et al: "Porous silicon nanowires for lithium rechargeable batteries", Nanotechnology, Institute of Physics Publishing, GB, vol. 24, No. 42, Sep. 25, 2013 (Sep. 25, 2013), p. 424008, XP020252101, ISSN: 0957-4484, DOI: 10.1088/0957-4484/24/42/424008 [retrieved on Sep. 25, 2013] * paragraphs [2.2]-[2.6];p. 5, left-hand column. (7 pgs.).
Kang, Woohyeon, et al., "Waste glass microfiber filter-derived fabrication of fibrous yolk-shell structured silicon/carbon composite freestanding electrodes for lithium-ion battery anodes", Journal of Power Sources, 468 (2020) 228407. (7 pages).
Kong, Xiangzhong, et al., "Necklace-like Si@C nanofibers as robust anode materials for high performance lithium ion batteries", Science Bulletin 64 (2019) 261-269.
Lee, Dong Jin, et al., "Electrospun Three-Dimensional Mesoporous Silicon Nanofibers as an Anode Material for High-Performance Lithium Secondary Batteries", dx.doi.org/10.1021/am403798a, ACS Appl. Mater. Interfaces 2013, 5, 12005-12010.
Li, Changling, et al., "Silicon Derived from Glass Bottles as Anode Materials for Lithium Ion Full Cell Batteries", Scientific Reports, 7: 917, DOI:10.1038/s41598-017-01086-8, pp. 1-11.
Li, Hong, et al., "A High Capacity Nano-Si Composite Anode Material for Lithium Rechargeable Batteries", Electrochemical and Solid-State Letters, 2 (11) (1999) 547-549.
Li, Hong, et al., "The Crystal Structural Evolution of Nano-Si Anode Caused by Lithium Insertion and Extraction at Room Temperature", Solid State Ionics, 135 (2000) 181-191.

(56) References Cited

OTHER PUBLICATIONS

Liu, Wei-Ren, et al., "Effect of Electrode Structure on Performance of Si Anode in Li-Ion Batteries: Si Particle Size and Conductive Additive", Journal of Power Source, 140 (2005) 139-144.
Ohara, Shigeki, et al., "A Thin Film Silicon Anode for Li-Ion Batteries Having a Very Large Specific Capacity and Long Cycle Life", Journal of Power Sources, 136 (2004) 303-306.
Peng, Kuiqing, et al., "Silicon Nanowires for Rechargeable Lithium-ion Battery Anodes", Applied Physics Letters (2008) vol. 93, No. 3, pp. 33105-1 to 33105-3.
Shan, Jie, et al., "Silicon Nanofibers Used as Anode Materials for Lithium Ion Batteries", AUTEX2019—19th World Textile Conference on Textiles at the Crossroads, Jun. 11-15, 2019, Ghent, Belgium. (2 pages).
Shin, Heon-Cheol, et al., "Porous Silicon Negative Electrodes for Rechargeable Lithium Batteries", Journal of Power Sources, 139 (2005) 314-320.
Supplementary Partial European Search Report issued in European Patent Application No. 18855944.7, dated May 6, 2021, 10 pgs.
Wang, Fei, et al., "Ionothermal Synthesis of Crystalline Nanoporous Silicon and Its Use as Anode Materials in Lithium-Ion Batteries", Nanoscale Research Letters (2019) https://doi.org/10.1186/s11671-019-3024-9, pp. 2-9.
Wu, Lili, et al., "Carbon coated mesoporous Si anode prepared by a partial magnesiothermic reduction for lithium-ion batteries", Journal of Alloys and Compounds 716 (2017) 204-209.
Xing, An, et al., "A magnesiothermic reaction process for the scalable production of mesoporous silicon for rechargeable lithium batteries", Chem. Commun., 2013, 49, 6743-6745.
Zeng, Kun, et al., "A combination of hierarchical pore and buffering layer construction for ultrastable nanocluster $Si/SiO_x$ anode", Nano Research, ISSN 1998-0124 CN 11-5974/O4, http://doi.org/10.1007/s12274-020-2962-y, pp. 2987-2993.
Zhang, Sheng Shui, et al., "A Review on Electrolyte Additives for Lithium-Ion Batteries", Journal of Power Sources, 162(2), 1379-1394, (2006).
Zhao, Dongyuan, "Triblock Copolymer Syntheses of Mesoporous Silica with Periodic 50 to 300 Angstrom Pores", Science, vol. 279, Jan. 23, 1998, www.sciencemag.org, pp. 548-552.
Zou et al.; Silicon Based Lithium-Ion Battery Anodes: a Chronicle Perspective Review; Nano Energy, vol. 31, Jan. 2, 2017; <URL:https://zenodo.org/record/1197134#.W9DMf1VKjBs>; pp. 1-8, 76-113; 117 pgs.
First Office Action for Japanese Patent Application No. 2020-515679 issued by the Japan Patent Office, dated Sep. 28, 2021 (3 pgs.).
Extended European Search Report for European Patent Application No. 18855944.7 issued by the European Patent Office, dated Aug. 6, 2021 (9 pgs.).
First Office Action for Chinese Patent Application No. 201880073532.4 issued by the China National Intellectual Property Administration, dated Sep. 2, 2022 (8 pgs.).
English Translation of First Office Action for Chinese Patent Application No. 201880073532.4 issued by the China National Intellectual Property Administration, dated Sep. 2, 2022 (15 pgs.).
Search Report for Chinese Patent Application No. 201880073532.4 issued by the China National Intellectual Property Administration, dated Aug. 26, 2022 (4 pgs.).
English Translation of Search Report for Chinese Patent Application No. 201880073532.4 issued by the China National Intellectual Property Administration, dated Aug. 26, 2022 (4 pgs.).
Office Action for Korean Patent Application No. 10-2020-7009647 by the Korean Intellectual Property Office dated Jan. 16, 2024. (5 pgs.).
English Translation of Office Action for Korean Patent Application No. 10-2020-7009647 by the Korean Intellectual Property Office dated Jan. 16, 2024. (5 pgs.).

* cited by examiner

SILICON-BASED ANODE MATERIAL FOR LITHIUM ION BATTERY

CROSS-REFERENCE TO RELATED APPLICATIONS

This application is a Divisional of U.S. patent application Ser. No. 17/366,479, filed Jul. 2, 2021, which is a Continuation of U.S. patent application Ser. No. 16/130,778, filed Sep. 13, 2018, now U.S. Pat. No. 11,069,885, which claims priority to U.S. Provisional Application No. 62/558,107 filed Sep. 13, 2017, entitled "Battery Electrode Materials," the disclosures of which are hereby incorporated by reference in their entirety.

BACKGROUND

The present disclosure relates generally to high capacity negative electrode (anode) active materials based on silicon for lithium ion batteries. In particular, the present disclosure describes a silicon-based fibrous material that demonstrates improved cycle life over standard commercial grade silicon and improved capacity over graphite anode material.

Lithium ion batteries have proliferated in the last decade and now are the power source of choice for providing portable power to electronic devices, cordless equipment and vehicles. As technology has become increasingly reliant on lithium ion battery power, the lithium ion battery industry has worked to extend the performance of their cells in order to provide maximum versatility to the end user.

Graphite is commonly used in lithium ion cells, due to its ability to remain stable and serve its function over multiple hundreds of cycles with little to no capacity loss. Silicon shows great promise as an anode material, due to its extremely high capacity (4000 mAh/g) relative to graphite (372 mAh/g), which is the current industry standard. However, silicon has the limitation of swelling 350% upon lithiation. This swelling can cause severe disruption of the internal cell structure and result in rapid loss of capacity as cell components are damaged and the anode grinds itself into smaller pieces and ultimately loses electrical connectivity.

Thus, there is a continuing need for improved silicon-based anode materials and methods of preparing such silicon-based anode materials.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
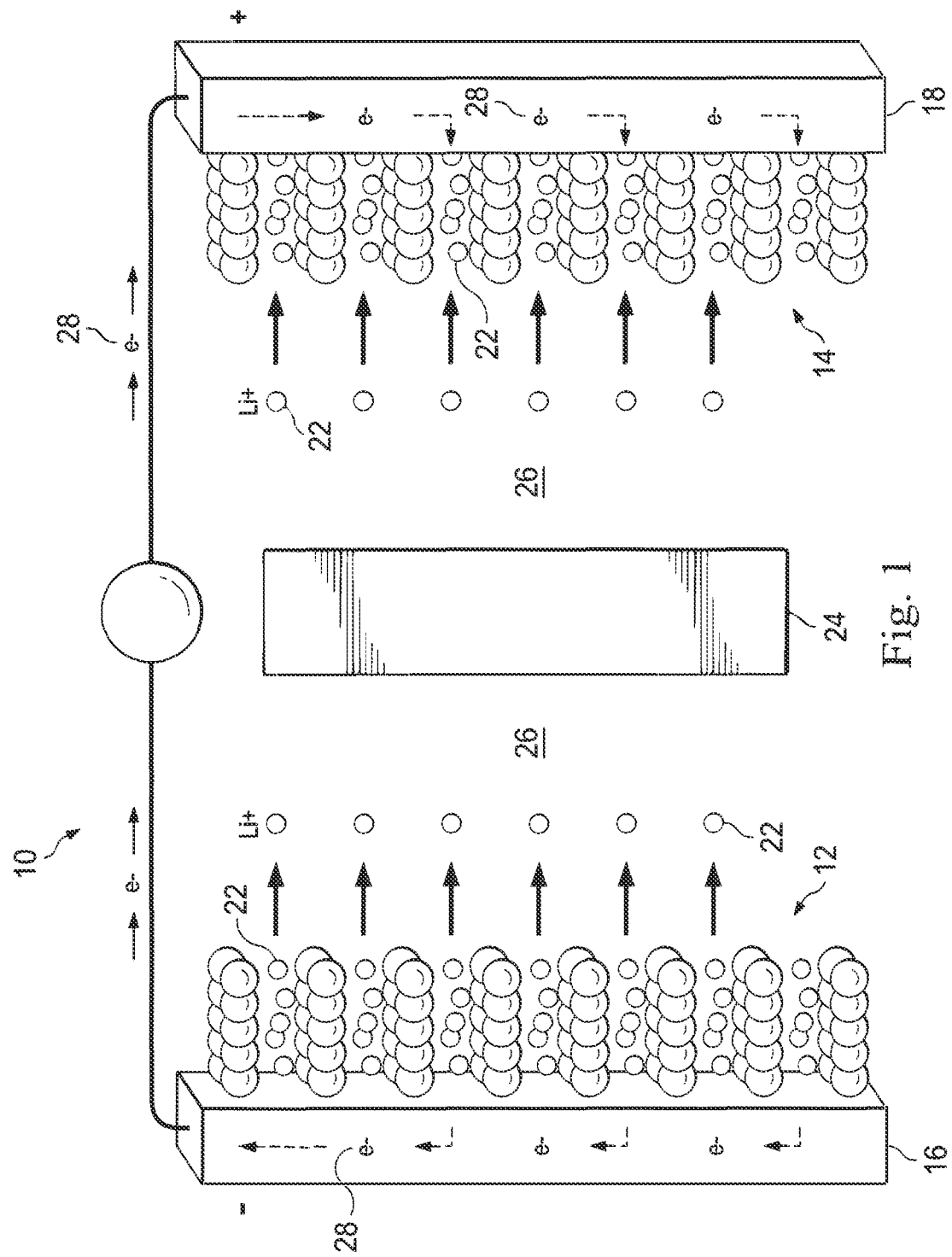
FIG. 1 illustrates a schematic of a lithium ion battery containing an anode and a cathode.

The present disclosure describes a porous reduced silica fiber having a diameter of from about 0.1 micron to about 20 microns, a high surface area (e.g., a surface area of about 5 to about 400 $m^2/g$), and interconnected or discrete porosity. As used herein, "surface area" is the surface area determined by the Brunauer-Emmett-Teller (BET) technique. In some embodiments, the porous reduced silica fiber has a surface area of about 30 to about 300 $m^2/g$. When any range of numbers is mentioned herein, every number within the range is specifically included herein.

In various embodiments, the porous reduced silica fiber is substantially free of silica. By "substantially free" is meant less than 20 weight percent, for example less than 10 weight percent, less than 5 weight percent, or less than 1 weight percent.

In some embodiments, the porous reduced silica fiber has a porosity of about 0.1 to about 0.7 $cm^3/g$. In other embodiments, the porous reduced silica fiber has a porosity of about 0.01 to about 1.5 $cm^3/g$. By providing internal porosity within the porous reduced silica fibers, an internal volume is created which can accommodate at least a portion of the silicon expansion without disrupting the fiber exterior or the electrode structure. The porous reduced silica fiber is capable of accepting lithium ions from and releasing lithium ions to an electrolyte.

The present disclosure also describes methods of producing the porous reduced silica fiber for use as an anode in a lithium ion battery. These methods rely on forming an $SiO_2$-based fiber (i.e. a silica-based precursor), and subjecting it to various processes to purify it to a predominantly silica chemistry and/or to create internal porosity in the silica-based precursor fiber. The silica-based precursor fiber is then subjected to a thermochemical reduction process to yield a reduced silica fiber comprising silicon with optional inclusions of SiO and/or $SiO_2$. As further described below, the silica-based precursor fiber may be produced by glass melting or chemical methods, such as a sol-gel process. In various embodiments, the porosity of the silica-based precursor fiber is intentionally introduced by chemical leaching, by heat treating, by forming the silica-based precursor fiber by a sol gel process from an assemblage of colloidal particulates, or by forming the silica-based precursor fiber from a solution and introducing a finely dispersed polymer into a fiberizing solution that when burned out leaves porous cavities in the fiber (i.e., polymer templating), or any combination thereof.

A chemical reduction process and subsequent purification method is then performed to remove some or all chemically bound oxygen from the silica-based precursor fiber, leaving a material with a chemistry including silicon (Si) and/or silicon monoxide (SiO). The material may also include residual silica or silicon dioxide ($SiO_2$). This material is referred to as the reduced silica fiber.

In several embodiments, an electrode is formed from the reduced silica fiber using standard battery manufacturing techniques. Advantageously, the electrode has a higher capacity than existing graphite electrodes and has improved cycle life over comparable commercial silicon when utilized in a lithium-ion half-cell or full battery. In other embodiments, a fibrous paper formed from the reduced silica fiber is utilized as the anode, thus eliminating the need for a current collector.

In certain embodiments, a melt-derived silica-based precursor fiber is produced with diameters from about 0.1 microns to about 20 microns. This fiber may then be chemically treated (i.e., leached) to remove the non-silica components, leaving behind a fiber with a principally silica composition. This fiber may then be subjected to a thermal reduction step in order to convert the silica to metallic silicon via removal of the oxygen.

In other embodiments, a silica-based precursor fiber with diameters from about 0.1 microns to about 20 microns with controlled porosity is produced via sol-gel methods, and then subjected to a reduction step to produce a reduced silica fiber. The dimensions and/or porosity of the reduced silica fiber may be sufficient to accommodate the high expansion upon lithiation, thus avoiding damage to the anode and enabling a long cell life with the benefit of the high capacity of silicon.

As used herein, "capacity" means a measure of the overall charge that can be delivered by the battery and determines the run time that the battery can provide under a given load condition. In a practical sense, capacity determines the hours of use of the battery. Capacity is measured as the product of delivered current multiplied by the duration of delivery. This is commonly quoted as Amp·hours or milliamp·hours (mAh).

Specific capacity is defined by the overall capacity per unit weight or volume of the cell. Specific capacity may be quoted for active materials alone (anode or cathode materials), an individual cell (including active materials, current collectors, electrolyte, and the "can" or housing) or an entire battery pack. Units are typically quoted as Amp hours per gram (A·h/g) or Amp hours per cubic centimeter (A·h/cm$^3$).

As used herein, "cycle life" means the number of complete charge/discharge cycles that the battery is able to support before its capacity falls below 80% of its original capacity. As used herein "capacity retention" means the fraction of the full capacity available from a battery under specified conditions of discharge after it has been cycled or stored for a period of time.

With use and over time, batteries experience physical changes of their internal components. This can be driven by consumption/conversion of electrolyte, formation of reacted layers on the anode and cathode (referred to as the Solid-Electrolyte-Interface or SEI) or physical deterioration of the internal cell structure by swelling/contraction that occurs with charge/discharge cycles (typically loss of electrical connectivity between the particles making up the anode or cathode). The overall result is a reduction of overall cell capacity. Discharge curves obtained over the operating life of a cell show a gradual reduction in capacity. The definition of effective end of life for a cell is somewhat arbitrary, but is generally taken as a 20% reduction in capacity, leaving 80% of the original capacity available for use.

Along with higher capacity and improved cycle life, the electrode produced from the reduced silica fiber may facilitate improved charge/discharge rates. The reduced silica fiber has high surface area and reduced volume (high SA/V ratio). This allows lithium to enter and leave the structure rapidly (a surface-limited reaction) and also reduces the distance lithium must diffuse once it enters the structure.

As used herein, "charge rate" means the rate at which electrical current is applied to a cell to restore its capacity. Battery rate capability is a measure of the cell's ability to deliver a given current to a load or to accept a given current during charging. Rate capability is expressed by discharge curves which plot cell voltage (vertical axis) vs. time (horizontal axis) under a given charge/discharge current. It is found that as current increases, the battery's ability to accept or provide a stable voltage over an extended period of time is diminished. In this sense, battery capacity tends to decrease as rate increases. The ability to move lithium into and out of cathode and anode materials is the limiting factor for achieving stable voltage and long run time at a high rate. As a kinetic parameter, charge/discharge rate is also linked to the temperature performance of the cells. The industry desires batteries that are capable of operating satisfactorily at the extremes of temperatures typically encountered in their use.

Rates are typically referred to as "C" values. A "C" charge rate will charge the full capacity of a given cell in 1 hour. A charge rate of "2C" will charge the same cell in 30 minutes. A charge rate of "C/2" will charge the same cell in 2 hours.

Lithium Ion Battery Structure

A typical lithium ion battery cell includes an outer metal housing. Enclosed within the outer metal housing are a cathode (i.e., positive electrode), an anode (i.e., negative electrode), and a separator. In a typical cylindrical lithium ion battery, the cathode, anode and separator are provided in the form of a long spiral roll of thin sheets. Alternately, they may be provided in a stacked or Z-Fold configuration in the case of pouch or coin cells. The cathode, anode and separator sheets are submerged in a solvent that acts as an electrolyte. The separator physically and electrically separates the anode and cathode while permitting lithium ions to pass through it.

In a typical lithium ion cell, the cathode is made from a mixed lithium-metal oxide material, such as lithium cobalt oxide ($LiCoO_2$), lithium iron phosphate ($LiFePO_4$), or lithium manganese oxide ($LiMn_2O_4$). Other cathode materials include lithium manganite ($Li_2MnO_3$), and lithium titanate ($Li_4Ti_5O_{12}$), among others.

In common conventional lithium ion batteries, the anode is made of carbon, such as graphite. During the charging process when the cell is absorbing power, lithium ions move through the electrolyte from the cathode to the anode and attach to or associate with the carbon. During the discharging process when the cell is providing power, the lithium ions move back through the electrolyte from the carbon anode to the lithium-metal oxide cathode. Liquid electrolytes in lithium-ion batteries include lithium salts, such as lithium hexafluorophosphate ($LiPF_6$), lithium tetrafluoroborate ($LiBF_4$) or lithium perchlorate ($LiClO_4$) in an organic solvent, such as ethylene carbonate, dimethyl carbonate, and diethyl carbonate. During both the charging and discharging processes, the lithium ions pass through the separator layer, which may typically be a perforated thin plastic sheet that separates the cathode and anode, but permits the flow of the lithium ions.

Turning now to FIG. 1, shown is a schematic representation of a lithium ion battery, containing an anode and a cathode. Lithium ion battery 10 includes a negative electrode or anode 12, and a positive electrode or cathode 14. According to the present disclosure, the anode 12 includes reduced silica fibers having a fine diameter, a high surface area, and interconnected or discrete porosity. The cathode 14 may include lithium-containing mixed metal oxide fibers having a fine diameter, a high surface area, and interconnected or discrete porosity. A copper current collector 16 is in electrical contact and associated with the anode 12, and an aluminum current collector 18 is in electrical contact and associated with the cathode 14.

Lithium ions 22 associate with the anode and cathode materials. A permeable polymer separator 24 isolates the positive electrode materials from the negative electrode materials, but allows the lithium ions 22 to pass through an electrolyte 26 between the electrodes 12, 14. During discharge of the lithium ion battery 10, lithium ions 22 move from the anode 12 through the electrolyte 26 to the cathode 14, causing electrons 28 to move in the opposite direction around the circuit to power the load. Charging the battery 10 forces the lithium ions 22 to move back across the separator 24 to associate with the anode 12, to permit the next discharge cycle.

Generally, the methods of forming the silicon-based anode of the present disclosure include four steps: (1) producing a precursor silica fiber, (2) subjecting the precursor silica fiber to a reduction step to remove oxygen and produce a reduced silica fiber, (3) washing and purifying the reduced silica fiber, and (4) forming an electrode with the washed and purified reduced silica fiber for use in a lithium ion cell.

Producing a Silica-Based Precursor Via Fiber Solution Spinning Methods

According to several embodiments, the silica-based precursor fiber is produced by the utilization of a sol-gel or solution spinning process to generate a silica fiber, which may then be further reduced to silicon. In this process, a silica precursor, such as colloidal silica, siloxanes such as pentaethoxypropanedisiloxane (PEDS), water glass (soluble alkaline silicates such as sodium silicates), or silicon alkoxides such as tetraethylorthosilicate (TEOS), tetramethylorthosilicate (TMOS), methyltriethoxysilane (MTES) or methyltrimethoxysilane (MTMS), is placed in solution or dispersion (sol) along with other chemicals to produce a condensation/cross-linking reaction. Colloidal silica may include Levasil® available from AkzoNobel, or other colloidal silica products available from CWK, Grace, Merck, Bayer, Nalco or Dow.

In addition, templated porosity may be created in the spinning product by introducing to the spinning solution a polymer/surface active agent with the appropriate solubility/cloud point characteristics, as described in more detail below and in European Patent Application 0 318 203 and U.S. Pat. No. 5,176,857, the disclosure of each of which is hereby incorporated by reference in its entirety. Examples of surface active agents include alkylethoxylates, alkylphenylethoxylates, polypropyleneoxide-polyethyleneoxide block copolymers, comb-type siloxane-polyethoxylate copolymers and polyethoxylated amines. This introduces micelles in the as-formed fibers, which leave pores of controlled dimension in the final fiber structure.

By controlling the addition of the surface active agent and the resulting micelle size in the solution or sol, the volume and dimensions of pores in the final product can be directly controlled. Pore sizes may be controlled down to levels of tens of angstroms or nanometers.

By controlling the temperature of the solution, fiberization may be made to occur at or just above the cloud point of the polymer/surface active agent. "Cloud point of the polymer" is defined as the temperature at which the polymer becomes insoluble in the solution and begins to form as a finely-divided second phase. The resulting micelles of polymer serve to form a templated polymer phase region in the solution. As the material is attenuated (i.e., stretched) into a fibrous shape, the polymer phase is elongated, forming axially-oriented porosity. Pore size and volume may be controlled by using specific concentrations of polymer, controlling temperature in the solution, fiberization and fiberization atmosphere, shear rate, relative humidity of the fiberization atmosphere, among other variables. Once formed, the fiber may then be subjected to specific heat treatment protocols to decompose organic materials (e.g., the fiberization aid and templating polymer) and to affect crosslinking and bonding within the colloidal silica.

Certain polymers, such as polyethylene oxides, polyvinyl alcohols, polyethylene glycols, celluloses such as methyl or ethyl cellulose, polyvinyl pyrrolidone or a starch may be added to this solution or sol to provide the necessary rheology for fiberization. Fiberization may take place by any methods known to those of ordinary skill in the art for sol-gel fiberization, such as solution spinning, extrusion, blowing or electrospinning.

In some embodiments, the sol-gel process for the manufacture of the precursor silica fiber includes fiberizing a liquid having a viscosity between about 1 and about 1000 poise, for example between about 70 and about 300 poise, and in another example from about 100 to about 450 poise. One suitable solvent for use in the sol-gel process is water due to its low cost, availability and low toxicity. Other polar solvents such as methanol, ethanol and acetone can be used under certain circumstances, provided appropriate oxide precursors are selected. Some non-polar compounds such as octane, benzene or toluene can also be used.

The liquid is fiberized by any convenient method, such as centrifugal spinning, electrospinning, drawing, blowing, tack-spinning, extrusion of the liquid through a spinneret or suitable combinations thereof. Any means apparent to those of ordinary skill in the art may be used for spinning the liquid.

After the liquid is fiberized, such as by spinning, the resulting fiber is dried and heated, optionally in an oxygen containing atmosphere for a sufficient time and at a sufficient temperature to convert the compound to the oxide in the fiber. The fiber is dried by any suitable means, for example, by heating the fiber at a temperature from about 30° C. to about 150° C., optionally under a reduced pressure. Any other suitable means for drying the fiber may be employed, for example, by circulating dehumidified air or gas around the fiber.

The dried fiber is heated for a sufficient time and at a sufficient temperature to remove organic components of the sol. The heating temperature for silica/silicon fibers may be between about 400° C. and about 1000° C., for example between about 650° C. and about 750° C. The heating time may be in excess of about 15 minutes and may be in excess of about 1 hour.

In certain embodiments, the sol-gel process provides for the production of silica-based precursor fibers having a high proportion of axially-aligned pores. In various embodiments, at least 25% and typically a much higher proportion than 25% of the total porosity in the silica-based precursor fibers is provided by axially-aligned pores.

In some embodiments, axially-aligned pores are achieved by spinning into fibers a solution or sol including a compound decomposable to silica on heating and a non-ionic surface active agent having a cloud point in the spinning solution above the spinning temperature but not greater than 20° C. above the spinning temperature. The fibers are subsequently heated to convert the compound into silica.

In one embodiment the spinning temperature is about 25° C. and the surface active agent has a cloud point in the spinning solution of below 45° C. As spinning temperature is increased, the acceptable cloud point of the surface active agent increases. For example, for a spinning temperature of about 50° C., the cloud point of the surface active agent will be below 70° C. In certain embodiments, the cloud point of the surface active agent is at least 5° C. above the spinning temperature and not more than 15° C. above the spinning temperature.

As used herein, "spinning temperature" means the maximum temperature which the spinning solution or sol attains during the extrusion and draw down (extension) stages of the fiber-forming process. Thus, extrusion of a solution or sol into a heated environment will result in a rise in temperature in the solution or sol during draw down (extension) into green fibers. The spinning temperature in such a case is the maximum temperature attained by the solution or sol (green-fibers) before draw-down (extension) is completed. Generally the spinning temperature will be the wet bulb temperature of the attenuating air.

As used herein, "cloud point of the surface active agent" means the temperature at which the spinning solution containing the surface active agent becomes cloudy when heated. Aqueous solutions of non-ionic surfactants become cloudy when heated, and the cloud point of these is determined by immersing a boiling tube containing about 10 mL of the solution in a cool stirred water bath, and then heating the bath at a rate of 1° C. per minute. The solution in the tube is unstirred or stirred very gently (to avoid bubbles) with a spatula. The solution becomes cloudy over a narrow temperature range within 1-2° C., and the clouding temperature, or cloud point may then be noted.

Surface active agents of several chemical types (as described above) may be employed. It will be appreciated that within each of these chemical classes of surface active agents there may be those which have a cloud point too high to be useful in the process as well as those which are useful in the process. It is, however, a matter of simple routine experimentation to measure the cloud point of a surface active agent to determine its suitability for use in the process. Blends or mixtures of surface active agents may be employed to provide a suitable cloud point.

The amount of the surface active agent used in the spinning solution may vary within a wide range but will usually be at least 1% by weight based on the spinning solution. The amount may be from 1% to 30% by weight of the solution, and in certain embodiments, from about 3% to about 10% by weight of the solution.

In several embodiments, the spinning solution or sol contains precursors of stabilizing and/or sintering additives for the fibers in addition to the surface active agent. In a particular embodiment, the surface active agent may itself be a source of phase stabilizer or sintering agent in the resulting fibers. For example, use of a siloxane copolymer as the surface active agent leads to the formation of silica in the fibers when the fibers are heated to decompose the silicon oxide precursor to silica. A stabilizing agent of which precursors may be incorporated in the spinning solution or sol is therefore silica, such as silica sol, for silica fibers.

The diameter of the silica-based precursor fibers produced in this manner may be from about 0.1 microns to about 20 microns, in particular below about 10 microns. In one embodiment, the diameter of the silica fibers is from about 2 microns to about 15 microns. Such diameters are determined by the fiberizing conditions, e.g., the size of the spinneret orifices and by the characteristics of the liquid being fiberized, particularly the viscosity of the liquid and the percentages of oxidizable compounds in the liquid. Higher viscosities and higher solids content in the liquid results in larger diameter fibers.

The density of the silica fibers is largely dependent upon the heat treatment to which the fibers have been subjected. After spinning and at least partial drying, the silica-based precursor fibers are typically heated at a temperature of from about 200° C. to about 600° C. to decompose the organic oxide precursor. This heating step may or may not utilize steam. The fibers are further heated to burn out any organic residues and to cross-link the resulting silica fibers, and then the fibers are optionally even further heated to sinter the silica fibers. After the steam treatment, the silica fibers are highly porous and high porosity is retained during heating up to, for example, 600° C. to 700° C. for silica fibers. Thus, by controlling the sintering temperature and amount of phase-stabilizer present, low density fibers of high porosity may be obtained. Generally, higher treatment temperatures will shrink the fibers and reduce porosity.

The fibers may be produced by any techniques of fiber formation known to those of ordinary skill in the art. For example, both short (staple) and nominally continuous fibers can be produced by a blow spinning technique or a centrifugal spinning technique. Continuous fibers can be produced by the conventional extrusion/wind-up technique.

In silica-based precursor fibers produced by a blow-spinning technique or a centrifugal spinning technique, a spinning formulation may be formed into a multiplicity of fiber precursor streams that are dried at least partially in flight to yield gel fibers which are then collected on a suitable device such as a wire screen in the case of short (staple) fibers or a wind up drum rotating at high speed in the case of nominally-continuous fibers.

The spinning formulation may be any of those known to those of ordinary skill in the art for producing sol gel oxide fibers and is typically a spinning solution or sol free or essentially free from suspended solid or gel particles of a size greater than 10 microns. In certain embodiments, the solution or sol is free from particles of a size greater than 5 microns.

The resulting silica-based precursor fiber is essentially $SiO_2$, and may contain porosity resulting from its colloidal nature, from the polymer templating process, or both.

Producing a Silica-Based Precursor Fiber Via Leached Glass

According to other embodiments, the silica-based precursor fiber may be produced from a melt-derived, silica-based glass fiber, whose composition is capable of being chemically leached to remove the non-silica components to leave a silica skeleton. Such compositions are known in the industry and may include the Vycor® composition (sodium borosilicate), sodium silicate, or any other composition capable of having its non-silica components leached out by chemical treatment, which is typically acid treatment, although any feasible method may be used. One such composition comprises sodium alumino-silicate (produced by Unifrax Specialty Fibers, Unifrax I LLC of Tonawanda, N.Y.) and used as a precursor for leached silica fiber.

The silica-based precursor fiber may be produced from the silica-based glass melt by any applicable means, including but not limited to: blowing, centrifugally spinning, rotary spinning, flame blowing, bushing extrusion, single filament extrusion or electrospinning.

The silica-based precursor fiber may have porosity as a result of the chemical leaching, and this is considered a benefit, since it increases the surface area and therefore the kinetics of lithiation, as well as providing space for expansion during lithiation. In particular, Vycor® compositions have the benefit of being phase separated. The soluble component of the glass exists as a separate phase whose microstructure may be controlled by varying the time and temperature of heat treatment. This microstructure consists of one phase containing a high concentration of sodium oxide ($Na_2O$) and boron trioxide ($B_2O_3$), which is highly soluble in acid and a second phase consisting of approximately 96% $SiO_2$, which is relatively insoluble in acid. By subjecting this material to an acid leaching step, the acid soluble phase of $Na_2O$ and $B_2O_3$ may be removed, leaving only the 96% $SiO_2$ phase. The resulting material is not only high in $SiO_2$, but also contains substantial internal porosity. Porosity may be adjusted by further heat treatment, causing a coalescence of porosity. This may form into an interconnected or non-interconnected structure.

With Vycor® compositions, the size and structure of the pores may be tuned to give preferred results. Pores may be tailored to be large or small, such as on the order of about 1 angstrom (Å) to about 200 Å in diameter, for example 40 Å to about 80 Å, and/or to be interconnected or discrete. This feature is applicable to phase separated glass (melt or fiber) compositions in which one phase contains the preferentially soluble material.

An additional example is the production of leached silica glass, such as material marketed as Belchem® fiber materials or Valmiera fibers. In these materials, glass fibers are produced from leachable glass compositions. These fibers are then subjected to a leaching step in acid (commonly HCl) to leach out $Na_2O$ or other soluble components via an ion exchange or leaching process, leaving a fibrous silica structure.

This strategy may be extended to any range of similarly soluble glass fibers which consist of a silica matrix with additions of leachable components such as $Na_2O$, $B_2O_3$, potassium oxide ($K_2O$), lithium oxide ($Li_2O$), calcium oxide (CaO), phosphorus pentoxide ($P_2O_5$) or magnesia (MgO), among others. These fibers may be subjected to leaching in acidic, neutral or basic solutions to effect the leaching needed to produce a silica fiber. Depending upon the glass and leaching conditions, these materials may also display high surface area and substantial internal porosity. Example glass fibers to be used as starting materials include low biopersistence refractory fibers such as Isofrax® fibers, Insulfrax® fibers, Superwool fibers, or Superwool HT fibers, or Stone Wool type products such as Stonewool HT fibers.

In some embodiments, the silica-based precursor fiber is prepared from glass fibers. Methods for the preparation of silica fibers from glass fibers are described in U.S. Pat. Nos. 2,215,039; 2,221,709; 2,461,841; 2,491,761; 2,500,092; 2,624,658; 2,635,390; 2,686,954; 2,718,461; and 2,730,475, the disclosure of each which is hereby incorporated by reference in its entirety.

Glass fibers having high specific surface area, high tensile strength, consistent glass chemistry and purity are available from Unifrax Specialty Fibers (Tonawanda N.Y.). These fibers are produced by rotary and flame attenuation manufacturing processes. Average fiber diameters range from an extremely fine 0.1 μm to 5.0 μm. Typical glass fiber compositions are set forth in the table below.

TABLE 1

| Glass Fiber Compositions (Percent by Weight) | | | | |
|---|---|---|---|---|
| | Glass A | Glass B | Glass C | Glass E |
| $SiO_2$ | 68.0-71.0 | 55.0-60.0 | 63.0-67.0 | 50.0-56.0 |
| $Al_2O_3$ | 2.5-4.0 | 4.0-7.0 | 3.0-5.0 | 13.0-16.0 |
| $B_2O_3$ | <0.09* | 8.0-11.0 | 4.0-7.0 | 5.8-10.0 |
| $Na_2O$ | 10.5-12.0 | 9.5-13.5 | 14.0-17.0 | <0.50 |
| $K_2O$ | 4.5-6.0 | 1.8-4.0 | <2.0 | <0.40 |
| CaO | 5.0-7.0 | 2.8-5.0 | 4.0-7.0 | 15.0-24.0 |
| MgO | 2.0-4.0 | <2.0 | 2.0-4.0 | <5.5 |
| $Fe_2O_3$ | <0.20 | <0.20 | <0.20 | <0.50 |
| ZnO | <2.0 | 2.0-5.0 | <0.10 | <0.02 |
| BaO | | 3.0-6.0 | <0.10 | <0.03 |
| $F_2$ | | <1.0 | <1.0 | <1.0 |
| $TiO_2$ | | | | <1.0 |

*$B_2O_3$ contains 31.1% boron by weight. The maximum allowable boron content in A-Glass is 0.028%.

Glass fibers may be converted into a purer, high-silica fiber by extracting therefrom the monovalent, divalent, and trivalent metal oxide constituents to leave a fiber composed essentially of silica and containing a ratio of less than 10 parts of such metal oxides to 90 parts of silica and even as low as 1 or 2 parts of such oxides, the remaining oxide portion being silica. This is accomplished by leaching the fibers, either in loose masses or in fabricated form with acids, other than hydrofluoric acid or phosphoric acid, which attack silica, for a time and at a temperature sufficient to extract substantially all of the oxides other than silica. The treated fibers are then washed substantially free of acid and may be heated at an elevated temperature to dehydrate and shrink the fibers, if desired. The above process may result in shrinkage of fibers both in diameter and longitudinally.

Suitable leaching acids include for example, hydrochloric acid (HCl), sulfuric acid ($H_2SO_4$), nitric acid ($HNO_3$), acetic acid ($CH_3COOH$), chloroacetic acid ($ClCH_2COOH$), and chlorinated low molecular weight fatty acids, for example, trichloroacetic acid. The strength of the acid may be varied over a wide range, for example from 0.1 N to 5 N or higher. The leaching process may take place at elevated temperature ranging from 100° F. up to the boiling point of the acid, or above the boiling point by conducting the leaching in an autoclave under superatmospheric pressure.

It may be desirable to shrink the fibers by dehydration at elevated temperatures for a time sufficient to remove substantially all of the water of hydration and all adsorbed water, by heating, such as to a temperature of about 400° F. to 500° F. or higher for a time sufficient to remove water of hydration and adsorbed water without materially shrinking the fibers.

Borosilicate glass fibers may be readily leached with acid to remove the metal oxides other than silica, and may be dehydrated by heating to temperatures of about 1000° F., for example in the range of about 1400° F. to about 1600° F. By proper control of the acid extraction process, the resultant fibers after firing contain a high silica content and may be as high as 90% and even substantially 99.9% silica as determined by wet chemistry methods.

Producing a Reduced Silica Fiber from the Silica-Based Precursor Fiber

After forming a silicon-based precursor fiber, at least some portion of the chemically bound oxygen is stripped to arrive at a fiber containing elemental silicon. In order to be used as a battery anode, the resulting product may contain silicon metal, silicon monoxide and/or silica. Silicon, silicon monoxide and their alloys and combinations are electrochemically active and may be used as anode material in lithium ion batteries. In some cases, the mixed, alloyed state may be particularly desirable, as it permits the material expansion upon lithiation to be controlled (depending upon the alloy state) and potentially matched to the pore space available so that the expansion may be accommodated in the pore space.

Thermo-chemical methods to remove bound oxygen from materials are referred to herein as "reduction." This may be done by any variety of established methods, including reduction in a carbon monoxide (CO) atmosphere, hydrogen atmosphere, in contact with magnesium, aluminum or carbon, or any other effective means. The temperature of this reaction may be closely controlled in order to impact or preserve the porous structure of the fiber to insure it stays in a desired or an optimal range.

This type of reaction is commonly employed in the mining and metals industry for converting the naturally occurring oxide state of materials into a reduced state where it is no longer combined with oxygen and exists in the metallic state. Conversion of iron ore containing ferric oxide ($Fe_2O_3$) to metallic iron is one example of a reduction reaction. Another is the thermite reaction where iron oxide is mixed with aluminum powder and ignited, causing the oxygen to be stripped from the iron oxide and combine with the aluminum, leaving aluminum oxide and metallic iron.

Reduction may be accomplished by mixing the oxide to be reduced with the metallic form of a second material which has a greater chemical affinity for oxygen. This mixture is then heated to an elevated temperature to enable the reaction to take place spontaneously. In the case of silica, materials such as carbon (carbothermic reduction) or aluminum (aluminothermic reduction) or calcium may be used. These processes, however, have the disadvantage of requiring excessively high temperatures, which can impact the physical state of the resulting silicon, causing it to melt, or undergo severe porosity or surface area reduction and grain growth via sintering. In addition to high-oxygen-affinity solids, gases like hydrogen ($H_2$) and carbon monoxide may also be used to affect reduction. Their ability to reduce silica, however, is somewhat limited.

Silica reduction using magnesium (magnesiothermic reduction) is a highly useful method, as it can be accomplished at relatively low temperatures (600° C.-700° C.) and allows preservation of microstructures that may exist in the precursor silica material. In particular, porous, high-surface area structures, as obtained via polymer templating or other methods, may be preserved and/or enhanced via low-temperature magnesiothermic reduction.

In one embodiment, silica-based precursor fibers may be reduced by high temperature treatment with magnesium powder and converted into structures containing silicon (Si) or other reduced forms of $SiO_2$. The silica reduction via magnesium may be operated at a much lower temperature (650° C.) and shorter duration (30 minutes) than other methods such as carbothermic reduction (>1600° C.) or electrochemical reduction. Reduced silica fibers may be extracted from the reduction mixture by immersing the material in a 1-2 M HCl solution, which dissolves the Mg-based components while leaving Si-species unaffected, thus maintaining fiber morphology.

Washing/Purification of Reduced Silica Fiber

After reduction, the desired Si/SiO material exists in intimate combination with other reaction products from the reduction—for example, magnesium oxide (MgO), magnesium silicide ($Mg_2Si$) and forsterite ($MgSiO_4$), to name a few. It is necessary to purify this material to remove the unwanted materials, leaving relatively pure Si/SiO. This can be accomplished by washing the material in acid, particularly HCl. The reaction products MgO, $Mg_2Si$, $MgSiO_4$, and others are soluble in acid, while Si, SiO, and $SiO_2$ are not. The washing process thus eliminates the unwanted components and leaves the silicon alloys, which can be recovered by filtering the solution.

Forming an Electrode with the Washed/Purified Reduced Silica Fiber for Use in a Lithium Ion Cell The reduced silica fiber containing $SiO_x$ (x=0-2) synthesized using the above-described methods may be used in any application in which $SiO_x$ may have utility. This may include sensors, microelectronics and, in particular, lithium ion cells. Silicon finds application in lithium battery cells as an anode material, used to store lithium when the battery is in a state of charge. As current is demanded from the cell, the anode discharges its lithium content to the electrolyte where it diffuses into the counter-electrode for storage as the cell is discharged. Graphite is commonly used in lithium ion cells, due to its ability to remain stable and serve its function over multiple hundreds of cycles with no capacity loss. Silicon has the advantage of being able to retain over 10 times the amount of lithium per unit weight as compared to graphite. As described previously, however, silicon has the disadvantage of substantial swelling upon lithiation. By synthesizing a silicon material with internal porosity, it is anticipated that the negative impact of swelling will be mitigated by allowing an internal space for expansion to occupy.

In constructing a lithium battery cell anode, electrochemically active anode material is typically combined with other components, formed into a viscous slurry and applied to a copper foil current collector. Once applied to the current collector, the combination of the electrochemically active material and additives with the current collector are typically referred to as an anode.

The reduced silica fibers may be utilized in a method similar to standard graphite and silicon/$SiO_x$ powders to prepare an anode. It may be used in fibrous form, or may be ground to any fiber length range, or it may be ground or pulverized into a powder, such that the fibrous aspect ratio no longer exists.

The reduced silica fibers may be used as the sole active material, or may be blended with other active materials, including but not limited to graphite, other silicon alloy materials, tin oxide (SnO), or any other material with utility as an anode material. These active materials may be further mixed with other electrode components. For example, they may be mixed with carbon black or carbon nanotubes to provide electrical connectivity through the electrode material. They may also be mixed with binders which serve to hold the material together once it is placed on a current collector. The mixture of anode material and binders/viscosity modifiers is then applied to a copper foil current collector by any appropriate means such as roll coating, dip coating or doctor blading.

In some instances, the reduced silica fiber may be formed into a paper, consisting of fiber and optionally a binder, or the fiber may simply be self-entangled without a binder. The silicon-based fiber paper may contain other additives as described earlier—carbon black or carbon nanotubes for electrical connectivity. It may contain carrier fibers to add to mechanical integrity, or any other additive which is deemed necessary for any reason.

The reduced silica fiber may also be coated by any material which is deemed advantageous. In particular, a thin carbon coating may be applied to the fiber to aid in cycle life by enhancing fiber conductivity and/or suppressing excessive SEI formation. Coatings may be applied for any other reason as well.

One advantageous method of applying a carbon coating to the reduced silica fiber consists of a pyrolytic vapor deposition process. In this process, the reduced silica fiber is maintained in a controlled, inert atmosphere at elevated temperature (for instance, 950° C. under argon gas/hydrogen gas ($Ar/H_2$) (forming gas)). A gas containing a carbon-bearing component (for instance acetylene, or other hydrocarbon gas) is introduced and undergoes decomposition, leaving a carbon deposit on the fiber surface. A variety of inert atmospheres can be used, for instance, helium (He) or argon (Ar), or combinations thereof.

Electrodes made in this way may be employed for use in lithium ion batteries in the role of anode or cathode, depending on the nature of the counter-electrode.

Cathode Fibers

In various embodiments, a lithium ion battery cathode material is provided that includes mixed metal oxide fibers having a diameter in the range of about 0.1 to about 20 microns, a high surface area, and interconnected or discrete porosity, wherein the cathode material is capable of accepting lithium ions from and releasing lithium ions to an electrolyte.

According to certain embodiments, the mixed metal oxide fiber may have a surface area of about 5 to about 400 $m^2/g$ or in some embodiments, a surface area of about 60 to about 140 $m^2/g$.

According to certain embodiments, the mixed metal oxide fiber may have a porosity of about 5% to about 60%.

According to certain embodiments, the mixed metal oxide fiber may include oxides of lithium and at least one of aluminum, cobalt, iron, manganese, nickel, titanium and vanadium.

According to certain embodiments, the mixed metal oxide fiber may include at least one of lithium cobalt oxide ($LiCoO_2$), lithium nickel manganese cobalt oxide ($LiNi_{0.33}Mn_{0.33}Co_{0.33}O_2$), lithium nickel cobalt aluminum oxide ($LiNi_{0.8}Co_{0.15}Al_{0.05}O_2$), lithium permanganate ($LiMnO_4$), lithium iron phosphate ($LiFePO_4$), lithium manganese oxide ($LiMn_2O_4$), lithium manganite ($Li_2MnO_3$), and lithium titanate ($Li_4Ti_5O_{12}$).

According to certain embodiments, the mixed metal oxide fiber includes pores having diameters of 0.1 to about 100 nm or about 0.5 to about 25 nm.

Formation of Cathode Fibers

A wide variety of materials are used throughout the industry for lithium ion battery cathodes. These materials are typically lithium-containing metal oxides and may include (but are not limited to) lithium titanium disulfide ($LiTiS_2$), lithium cobalt oxide ($LiCoO_2$), lithium nickel manganese cobalt oxide ($LiNi_{0.33}Mn_{0.33}Co_{0.33}O_2$), lithium nickel cobalt aluminum oxide ($LiNi_{0.8}Co_{0.15}Al_{0.05}O_2$), lithium permanganate ($LiMnO_4$), or lithium iron phosphate ($LiFePO_4$). A number of synthesis routes have been used to produce cathode materials, including the sol-gel process, which is described further below. In the sol-gel process, metal salts may be dissolved and mixed in solution and precipitated into a colloidal suspension (sol). This colloidal suspension may be gelled by reducing the water content. The material is then dried, causing inorganic polymerization reactions to occur among the constituents. Further heat treatment results in the removal of salt anions and any organic material, and the densification and crystallization of the remaining oxide materials.

In various embodiments, high surface area cathode materials are prepared by the following method. First, a solution or sol containing the proportions of the desired metal salts or compounds as needed to achieve the appropriate stoichiometry of the cathode material is formed. In certain embodiments, the liquid contains from about 10 to about 70 weight percent of oxidizable precursor compounds of the inorganic oxides that will be included in the lithium ion battery electrode. Precursor compounds may include solvent soluble salts of the electrode metals. Examples of suitable inorganic salts are metal nitrates, chlorides and oxychlorides. Examples of suitable organic salts are metal salts of a lower alkyl organic acid such as acetates, chloroacetates, formates, oxyacetates, propionates, or butyrates, or of a lower alkyl hydroxy acid such as lactates. In addition, some salts can be utilized in blends or mixes. It is to be understood that essentially any compound, which can be dissolved in a solvent to form a solution that can be fiberized and that results in a metal oxide fiber upon heating to a sufficient temperature in an oxygen containing atmosphere, can be used as the inorganic oxide precursor, such as alkoxides of silicon and the metals aluminum (Al), cobalt (Co), iron (Fe), manganese (Mn), nickel (Ni), titanium (Ti), and vanadium (V).

In one embodiment, a spinning aid, such as an organic polymer, is included in the solution or sol as a spinning aid to provide the needed rheology for fiberization. Any other materials deemed desirable for the finished product (including but not limited to phase-change inhibitors or metal oxide powders for performance enhancement) may also be included.

The resulting material from the solution or sol may be fiberized using established fiberization methods. Such methods include, but are not limited to, (1) providing the solution or sol to a rotary disk, where it may be centrifugally extruded into fibers, (2) providing the solution or sol to an extrusion nozzle (or an assembly thereof) and extruding the solution or sol, with or without an attenuating air stream, as a continuous or discontinuous fiber, or (3) electrospinning.

In the process for the production of fibrous cathode materials, porosity may be introduced into the fiber structure by the inclusion of a non-ionic surface active polymer agent in the solution phase, containing the precursor metal salts, as described in more detail below and in European Patent Application 0 318 203 and U.S. Pat. No. 5,176,857, the disclosure of each of which is hereby incorporated by reference in its entirety. Examples of surface active agents include alkylethoxylates, alkylphenylethoxylates, polypropyleneoxide-polyethyleneoxide block copolymers, comb-type siloxane-polyethoxylate copolymers and polyethoxylated amines.

By controlling the addition of the surface active agent and the resulting micelle size in the solution or sol, the volume and dimensions of pores in the final product can be directly controlled. Pore sizes may be controlled down to levels of tens of angstroms or nanometers.

The resulting fibers are subjected to a drying and calcination step to remove water, residual organic components, and volatile salt anions. In some embodiments, the fibers may be subjected to a further heat treatment to develop a crystal structure for optimal cathode performance.

Finally, the fibers are disposed in an electrode structure suitable for use as or for inclusion in a cathode of a lithium ion battery.

The resulting fibrous materials may range from about 0.1 micron to about 20 microns diameter. By driving the active material particle structure to a smaller size, surface area-to-volume ratio is increased, which allows for more rapid kinetics of lithium ion insertion or removal by reducing diffusion distances and increasing the surface area for lithium ions to enter or leave the structure. The presence of porosity drives the surface area-to-volume ratio to a higher value than that of the fiber alone, further improving the kinetics of charge and discharge, i.e., lithium ion removal and insertion into the electrode structure.

Use as a Cathode

Porous high surface area cathode fibers may be fabricated into electrodes for use in a lithium ion battery. The fibers may be used as the sole active cathode material or mixed with other active cathode materials. The material may be mixed with other constituents such as conductive additives such as carbon black or carbon nano-fibers or binders. These mixtures may then be applied to aluminum current collectors and utilized as the cathode portion of a lithium ion battery.

According to several exemplary embodiments, a porous reduced silica fiber material having a diameter of about 0.1 to about 20 microns and a surface area of about 5 $m^2/g$ to about 400 $m^2/g$ is provided.

According to several exemplary embodiments, the porous reduced silica fiber material has a diameter of about 2 to about 15 microns. According to several exemplary embodiments, the porous reduced silica fiber material includes silicon, silicon monoxide, and silica, wherein the silicon is present in an amount of greater than about 20 weight percent.

According to several exemplary embodiments, the porous reduced silica fiber material has pore diameters of about 0.1 nm to about 150 nm. According to several exemplary embodiments, the porous reduced silica fiber material has pore diameters of about 1 nm to about 100 nm.

According to several exemplary embodiments, a process for producing the porous reduced silica fiber material includes providing a solution including a silica precursor, a polymer, and a surface active agent; fiberizing the solution to produce fibers; heating the fibers to produce silica-based precursor fibers; subjecting the silica-based precursor fibers to a magnesiothermic reduction to remove at least some oxygen from the silica-based precursor fibers and to produce reduced silica fibers; and washing the reduced silica fibers in an acid to remove magnesium-bearing reaction products and to produce the porous reduced silica fiber material.

According to several exemplary embodiments, a process for producing the porous reduced silica fiber material includes providing a melt comprising silica ($SiO_2$) and at least one of sodium oxide ($Na_2O$), boron trioxide ($B_2O_3$), lithium oxide ($Li_2O$), calcium oxide (CaO) and magnesia (MgO); fiberizing the melt to produce fibers; treating the fibers to remove non-silica components and produce silica-based precursor fibers; subjecting the silica-based precursor fibers to a magnesiothermic reduction to remove at least some oxygen from the silica-based precursor fibers and to produce reduced silica fibers; and washing the reduced silica fibers in an acid to remove magnesium-bearing reaction products and to produce the porous reduced silica fiber material.

According to several exemplary embodiments, a porous reduced silica fiber material having a diameter of about 0.1 to about 20 microns, a surface area of about 5 $m^2/g$ to about 400 $m^2/g$, and substantially free of silicon dioxide is provided.

According to several exemplary embodiments, the porous reduced silica fiber material has a surface area of about 30 $m^2/g$ to about 300 $m^2/g$. According to several exemplary embodiments, the porous reduced silica fiber material has a porosity of about 0.01 $cm^3/g$ to about 1.5 $cm^3/g$. According to several exemplary embodiments, the porous reduced silica fiber material has a median pore diameter of about 1 nm to about 90 nm.

According to several exemplary embodiments, the porous reduced silica fiber material has a plurality of axially-aligned pores. According to several exemplary embodiments, the porous reduced silica fiber material has pore diameters of about 0.1 nm to about 80 nm. According to several exemplary embodiments, the porous reduced silica fiber material has pore diameters of about 4 nm to about 40 nm.

According to several exemplary embodiments, a battery electrode that includes a binder and the porous reduced silica fiber is provided. According to several exemplary embodiments, the battery electrode has a Coulombic efficiency of about 30% to about 100%. According to several exemplary embodiments, the battery electrode has a capacity ratio C3/C1 of about 0.4 to about 1.0. According to several exemplary embodiments, the battery electrode has a capacity ratio C10/C1 of about 0.1 to about 1.0.

According to several exemplary embodiments, a lithium ion battery that includes the battery electrode is provided.

According to several exemplary embodiments, a porous mixed metal oxide fiber material having a diameter of about 0.1 to about 20 microns and a surface area of about 5 $m^2/g$ to about 400 $m^2/g$ is provided.

According to several exemplary embodiments, the porous mixed metal oxide fiber material has a surface area of about 30 $m^2/g$ to about 300 $m^2/g$. According to several exemplary embodiments, the porous mixed metal oxide fiber material has a porosity of about 5% to 50% by volume.

According to several exemplary embodiments, the porous mixed metal oxide fiber material includes oxides of lithium and at least one of aluminum, cobalt, iron, manganese, nickel, titanium, and vanadium. According to several exemplary embodiments, the porous mixed metal oxide fiber material includes at least one of $LiCoO_2$, $LiNi_{0.33}Mn_{0.33}Co_{0.33}O_2$, $LiNi_{0.8}Co_{0.15}Al_{0.05}O_2$, $LiMnO_4$, $LiFePO_4$, $LiMn_2O_4$, $Li_2MnO_3$, and $Li_4Ti_5O_{12}$.

According to several exemplary embodiments, the porous mixed metal oxide fiber material has pore diameters of about 0.1 nm to about 150 nm. According to several exemplary embodiments, the porous mixed metal oxide fiber material has pore diameters of about 1 nm to about 100 nm.

According to several exemplary embodiments, the porous mixed metal oxide fiber material is produced by sol-gel fiberization.

According to several exemplary embodiments, a lithium-based battery electrode comprising a binder and the porous mixed metal oxide fiber material is provided. According to several exemplary embodiments, a lithium ion battery comprising the lithium-based battery electrode is provided.

The following examples are illustrative of the materials and methods discussed above and are not intended to be limiting.

Example 1

Making the Silica-Based Precursor Fiber
Forming a Silica-Based Precursor Fiber Via Solution Spinning Levasil® 200s colloidal silica (solution containing 30% colloidal silica) with colloid size approximately 15 nm was used as the source of silica for a silica fiber. Siloxane (2 parts Evonik 5850 and 1 part Xiameter™ OFX-0193 fluid) was added to the colloidal silica for polymer-templating porosity. Polyethylene oxide (PEO) (Polyox™ WSR N-750) was added as a spinning aid to give the solution a rheology in order to allow fiber formation by an extrusion/blowing process. The resulting solution was thoroughly mixed in a paddle-type blender. This resulted in a solution with the following solids ratios: 450 g $SiO_2$ (from colloidal silica), 22.5 g $SiO_2$ (from siloxane) and 39 g PEO. The solution had a viscosity of 1-5 Poise at 30° C. The solution was then converted to fiber via an extrusion-blowing process. This resulted in a silica fiber with a median diameter of approximately 3 microns and a standard deviation of 1.3 microns, a surface area of 153 $m^2/g$, a pore volume of 0.285 $cm^3/g$, and a median pore diameter of 7.6 nm.

Reducing the Silica-Based Precursor Fiber 2.2 grams of the silica-based precursor fiber produced as described above was thoroughly mixed with 1.74 grams of magnesium metal powder (available from Alfa Aesar, 99.6% metals basis and having a particle size of −100 to +200 mesh) in a glovebox under an argon atmosphere. This mixture was packed into a stainless steel tube (½" outside diameter, 0.035" wall thickness) and sealed using stainless steel endcaps. The assembled, air-tight unit was then placed into a Lindberg/Blue M™ high temperature furnace, ramped at 5° C./min to 700° C. and held at 700° C. for 2 hours to allow the reduction reaction to occur.

Figure 2:
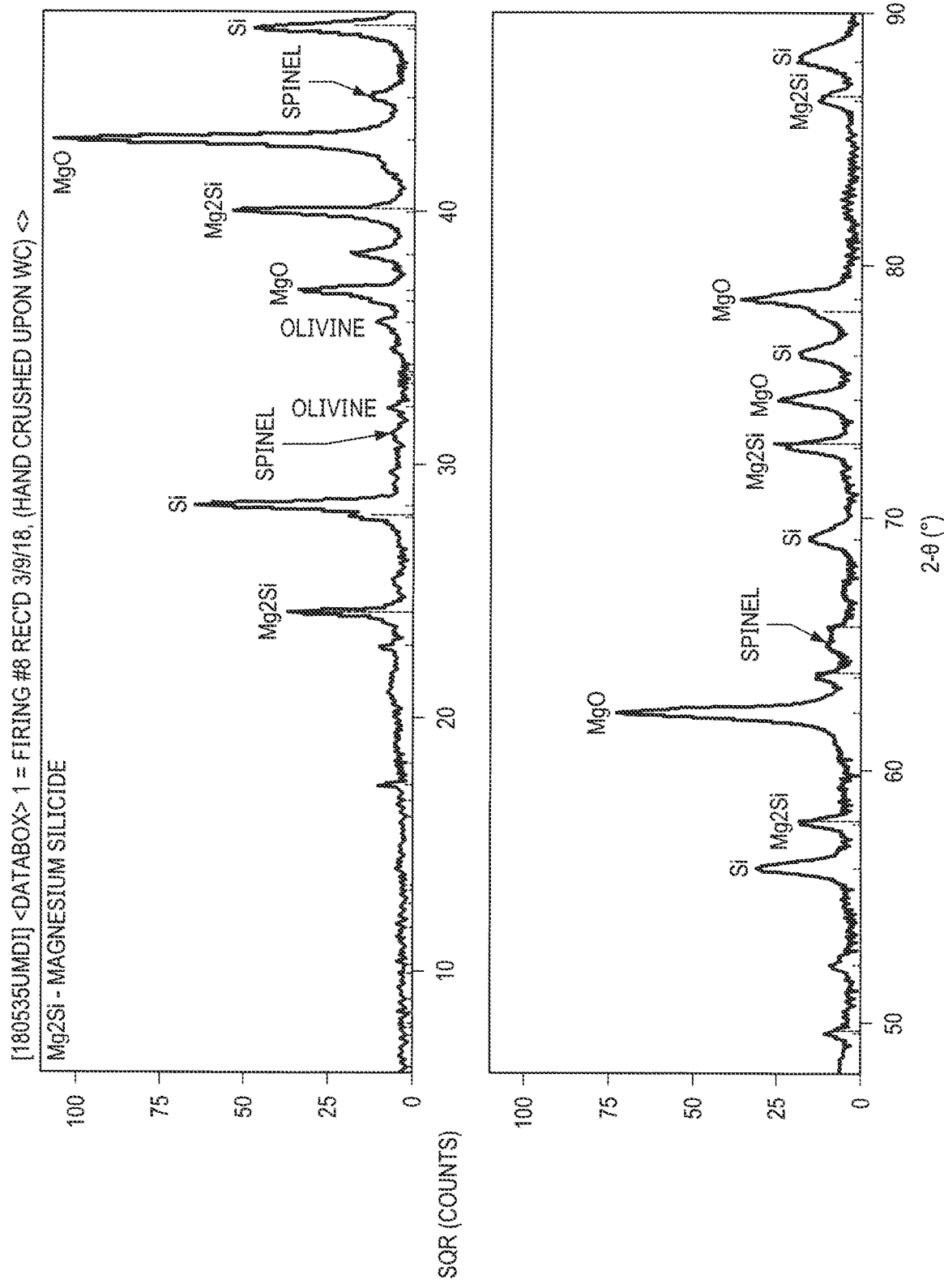
FIG. 2 is the x-ray diffraction (XRD) scan of the reduced mixture of Example 1.

At the conclusion of the reduction treatment, the material was allowed to furnace cool and the resulting mixture recovered. Subsequent x-ray diffraction (XRD) analysis showed the resulting material to be 17.4 wt % Si, 61.1 wt % MgO, 10.9 wt % $Mg_2Si$, 2.0 wt % Al, 5.9 wt % $Mg_2SiO_4$, and 2.7 wt % $MgAl_2O_4$. FIG. 2 is an XRD scan of the resulting mixture.

In practice, any suitable container may be used, provided it preserves the oxygen-free atmosphere needed for reduction. In addition, other gases besides argon could be used for instance, $H_2$, helium (He) or combinations of Ar and $H_2$ (i.e., forming gas) may be used, provided they do not react with the silica or magnesium used in the process. Also, a closed container need not be used. The reaction could also be allowed to proceed in an open environment or flow-through environment, provided a suitable atmosphere is maintained.

Acid Washing the Reduced Material

Figure 3:
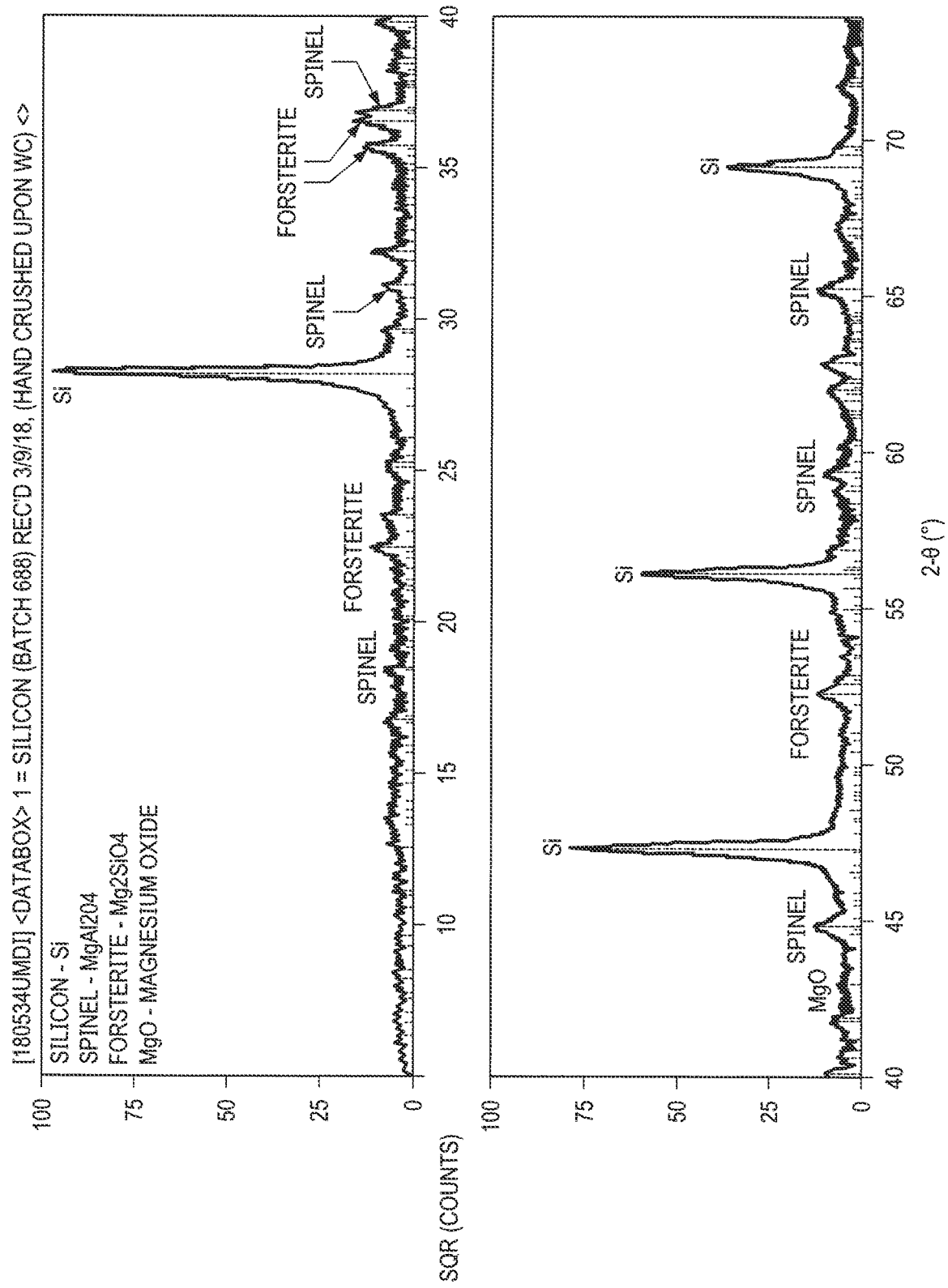
FIG. 3 is the x-ray diffraction (XRD) scan of the reduced mixture in Example 1 after washing with acid.

The reduced material from above then underwent acid washing to remove components other than silicon. This was done by adding the material to 2 M HCl and stirring for 3 hours. At the conclusion of the acid step, the material was filtered through Whatman™ 44 filter paper and the filtrate was washed twice in deionized water to remove acid residue, given a final filtration and then dried at 80° C. for 3 hours. The recovered material was then subjected to XRD analysis and found to be 41.7 wt % Si, 2.1 wt % $MgAl_2O_4$, 6.8 wt % $Mg_2SiO_4$, and 0.1 wt % MgO. An amorphous peak was found to be present at 49.3 wt %. FIG. 3 is an XRD scan of the reduced material after acid washing. It will be appreciated by those of ordinary skill in the art that any of a number of acids and concentrations may be used for the washing step, provided that Si metal and SiO are relatively insoluble in the solutions and MgO, $MgSiO_3$, $Mg_2Si$ and other by-products are relatively soluble.

During the acid washing process, sparks were observed when the material contacted acid, and it was determined this was due to formation of silane gas ($SiH_4$) resulting from the decomposition of $Mg_2Si$ in the acid. Silane is known to be highly flammable and capable of spontaneous ignition when oxygen is present; this oxidation reaction forms $SiO_2$ and potentially results in contamination of the product. In later experiments, this reaction was suppressed by adding the reduction mix to the acid under a nitrogen blanket. In this way, oxygen was kept away from the silane, thus suppressing its oxidation and conversion to $SiO_2$. In practice, any suitable inerting gas may be used, including argon, helium, carbon dioxide or others.

Example 2

Making and Testing Half-Cells

In order to assess the performance of the reduced silica fiber material as an anode, a set of half-cells were constructed to measure the electrochemical capacity and cycle life performance of cells utilizing the reduced silica fiber material.

The reduced silica fiber from Example 1 was mixed at 70 wt % with 20% Lith-X™ 50 carbon black conductive additive and 10% styrene-butadiene rubber (SBR) binder available from Targray Technology International Inc. Water was added as needed to achieve proper viscosity and the mixture was thoroughly blended to achieve a uniform mixture. This was then doctor bladed at a thickness of 200 microns onto a copper foil sheet which served as a current collector. The coating was then allowed to dry at approximately 90° C. under partial vacuum.

Coin-type half cells were then fabricated using the anode material in conjunction with a Celgard® 2325 separator and a lithium foil counter electrode. Electrolyte consisting of 1.2 M lithium hexafluorophosphate ($LiPF_6$) in 3:7 ethylene carbonate (EC): ethyl methyl carbonate (EMC) was added and the cell was sealed, and allowed to internally equilibrate for approximately 24 hours.

Coin-type half cells were then subjected to cycle testing by undergoing charge and discharge to insert or extract lithium ions from the silicon material. In this particular case, the first 2 cycles were performed at a charge/discharge rate of C/40 (cell charged/discharged fully in 40 hours), followed by 3 cycles at C/20 (cell charged/discharged in 20 hours) with subsequent cycles at C/10. This allowed the measurement of both the initial capacity (mAh/g of silicon material)

as well as first-cycle Coulombic efficiency (ratio of lithium insertion to lithium extraction) and cycle life, which was determined by tracking extraction capacity vs. cycle.

Similar cells, utilizing standard commercial graphite anodes (MAGE3 graphite available from Hitachi Chemical) and commercial battery-grade silicon available from Paraclete Energy were also tested to provide a comparative sample. Results are summarized as follows:

TABLE 2

Half-Cell Test Results

| Material | Cycle 1 Insertion Capacity (mAh/g) | Cycle 1 Extraction Capacity (mAh/g) | Cycle 1 Coulombic Efficiency (%) | Capacity Ratio C3/C1 | Capacity Ratio C10/C1 | Capacity Ratio C40/C1 |
|---|---|---|---|---|---|---|
| Graphite | 368.3 | 342.9 | 93.1 | 1 | NM | NM |
| Commercial Silicon | 3803.3 | 1648.0 | 43.3 | 0 | NM | NM |
| Reduced Silica Fiber | 2006.9 | 1369.0 | 68.2 | 0.41 | 0.11 | 0.06 |

NM = not measured

In Table 2, "Coulombic Efficiency" or "reversible capacity" is defined as the ratio of the extraction capacity to the insertion capacity for a given cycle. The columns labeled "Capacity Ratio" document the amount of capacity decay experienced with cycling by calculating the ratio of extraction capacity of a given cycle (in this case—cycle 3, cycle 10 and cycle 40) to the first cycle extraction capacity. Thus, a capacity ratio of 1 indicates no capacity decay with cycles, a ratio of 0.5 indicates 50% capacity decay on the given cycle and 0 indicates no remaining capacity (i.e., full cell failure) on the given cycle.

This data shows that the graphite has an extraction capacity of 342.9 mAh/g, the commercial silicon has an extraction capacity of 1648.0 mAh/g, and the reduced silica fiber has an extraction capacity of 1369.0 mAh/g, indicating that the reduced silica fiber is similar in extraction capacity to the silicon. In terms of cycling stability, the graphite has extremely stable cycling, with a Coulombic Efficiency of 93.1% and a C3/C1 capacity ratio of 1, while the silicon demonstrates a lower Coulombic Efficiency of 43.3% and no residual capacity after 3 cycles. In comparison, the reduced silica fiber demonstrates a Coulombic efficiency of 68.2% and much slower decay upon cycling, which is an improvement over the commercial silicon.

Example 3

Reduction Tests

Since it is known that material processing and microstructure can play a significant role in performance, a further study was undertaken using the silica-based precursor fiber of Example 1. This material was subjected to a variety of reducing conditions that involved (1) varying the ratio of silica to magnesium (in amounts ranging from stoichiometric (1 Mg per O) to 50% stoichiometry (1 Mg per 2 O), (2) varying the heating rate at temperatures above 400° C. from 1° C./min to 5° C./min, (3) varying the maximum temperature from 650° C. to 700° C., and (4) varying the hold time at the temperature from 2 hours up to 7 hours. Following the reduction process, the material was examined with XRD to determine the crystalline phase composition of the material. After acid washing as described in Example 1, the material was subjected to BET analysis to determine surface area, median pore diameter and overall porosity. The sample matrix for the study is shown in the following table. While this study represents a specific and limited range of reduction variables, it will be appreciated that material ratios, ramp rates, hold temperatures and hold times beyond these may also be feasible.

TABLE 3

Samples for Reduction Tests

| Sample | Precursor $SiO_2$ Fiber (grams) | Mg (grams) | Ramp Rate (° C./min) | Hold Temperature (° C.) | Hold Time (hr) |
|---|---|---|---|---|---|
| 1 | 2.14 | 1.74 | 5 | 700 | 2 |
| 2 | 2.21 | 1.81 | 1 | 650 | 7 |
| 3 | 2.14 | 1.74 | 1 | 700 | 7 |
| 4 | 2.14 | 2.61 | 1 | 700 | 7 |
| 5 | 2.14 | 1.74 | 1 | 700 | 3 |
| 6 | 2.14 | 2.61 | 1 | 700 | 3 |
| 7 | 2.14 | 1.74 | 1 | 650 | 3 |
| 8 | 2.14 | 2.61 | 1 | 650 | 3 |
| 9 | 2.14 | 2.61 | 1 | 650 | 7 |
| 10 | 2.2 | 1.34 | 1 | 650 | 7 |
| 11 | 2.2 | 0.89 | 1 | 650 | 7 |

Figure 4:
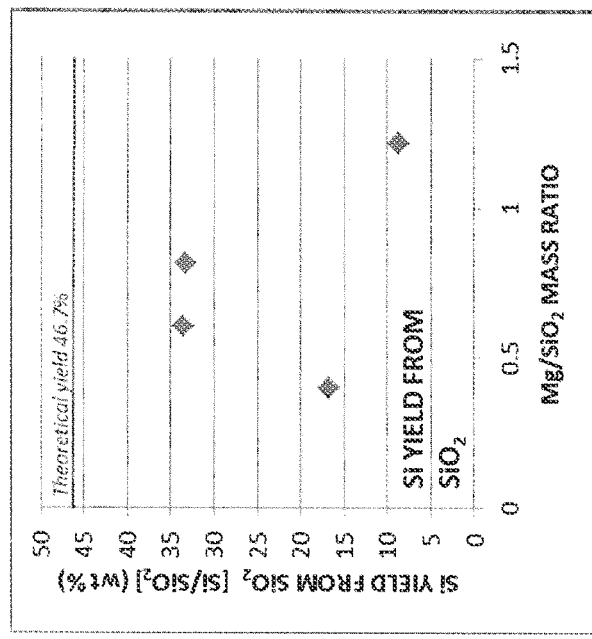
FIG. 4 illustrates the effect of the $Mg/SiO_2$ ratio on the percentage of $SiO_2$ converted to Si according to embodiments of the present disclosure.
Figure 5:
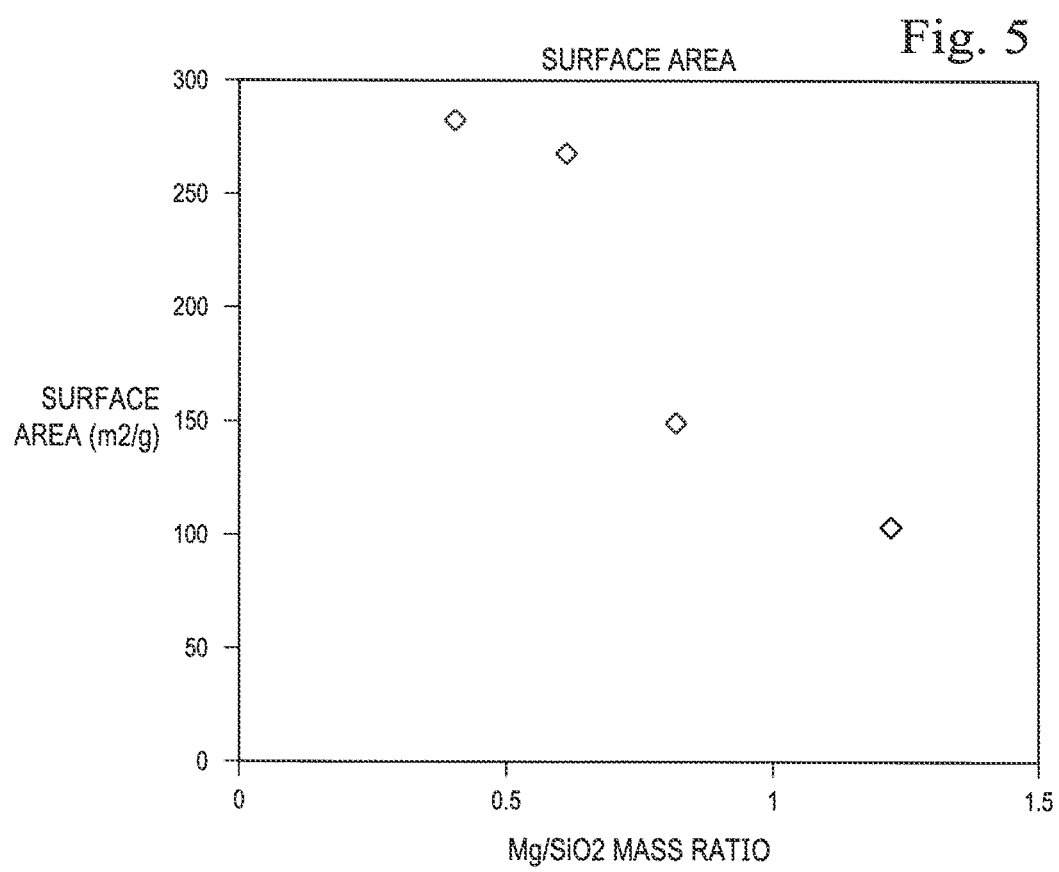
FIG. 5 illustrates the effect of the $Mg/SiO_2$ ratio on the surface area of the silicon-based fiber according to embodiments of the present disclosure.
Figure 6:
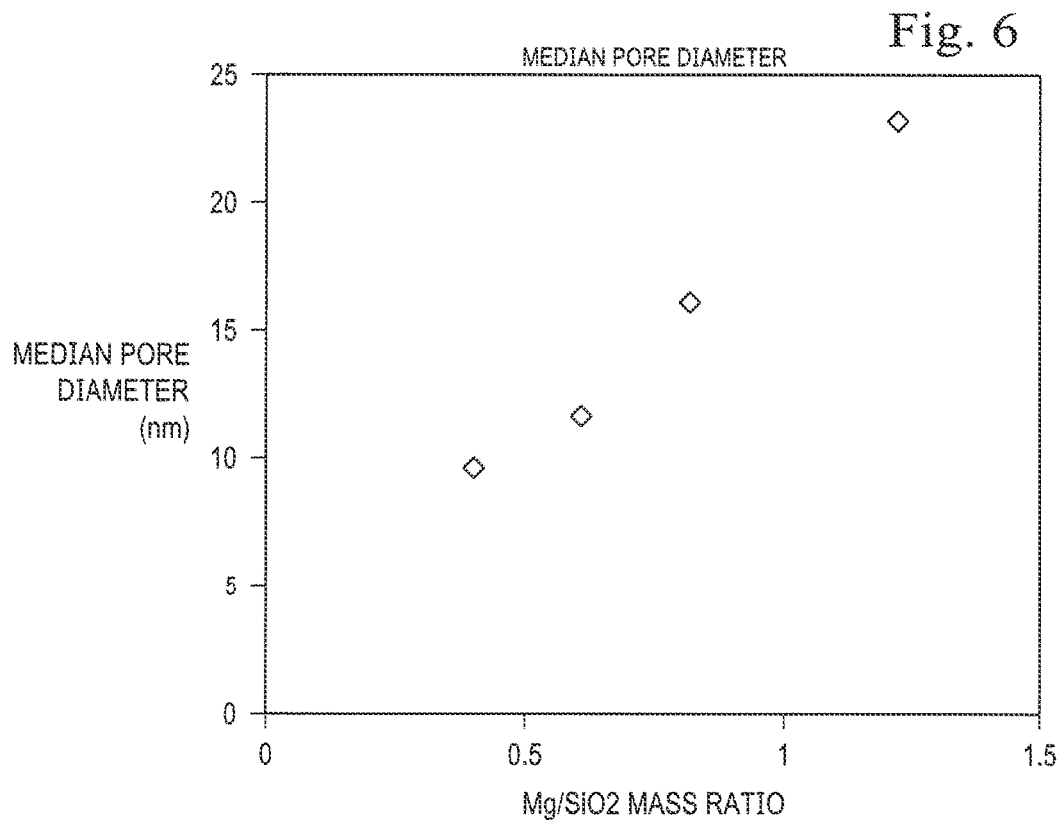
FIG. 6 illustrates the effect of the $Mg/SiO_2$ ratio on the median pore diameter of the silicon-based fiber according to embodiments of the present disclosure.
Figure 7:
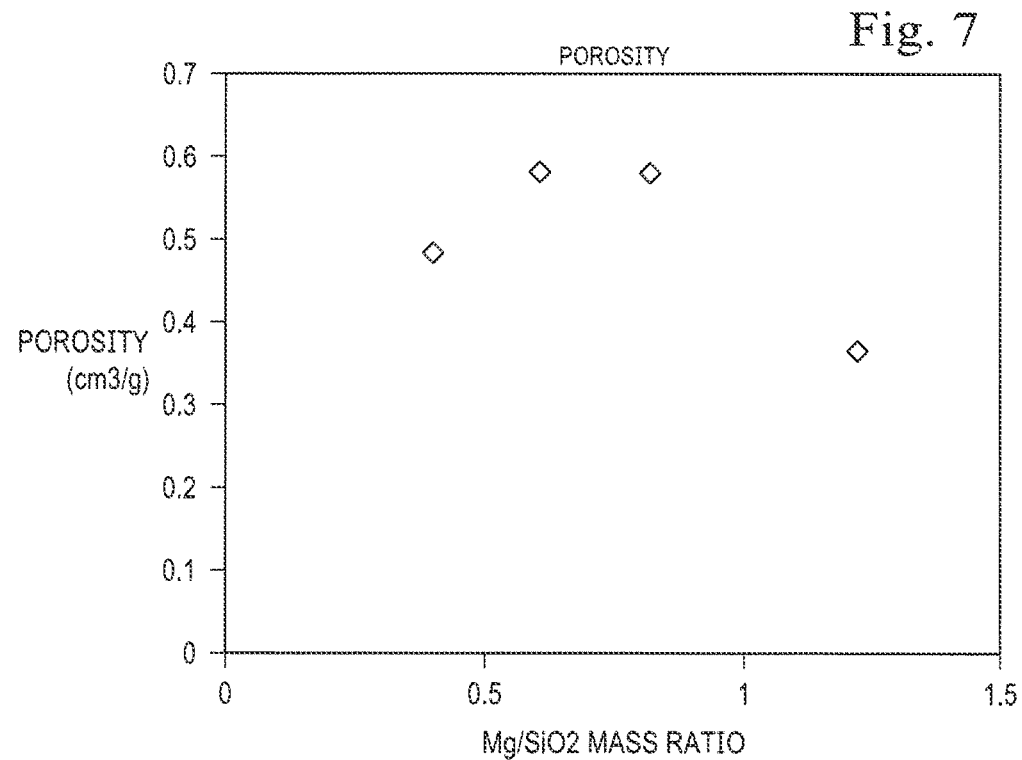
FIG. 7 illustrates the illustrates the effect of the $Mg/SiO_2$ ratio on the porosity of the silicon-based fiber according to embodiments of the present disclosure.
Figure 8:
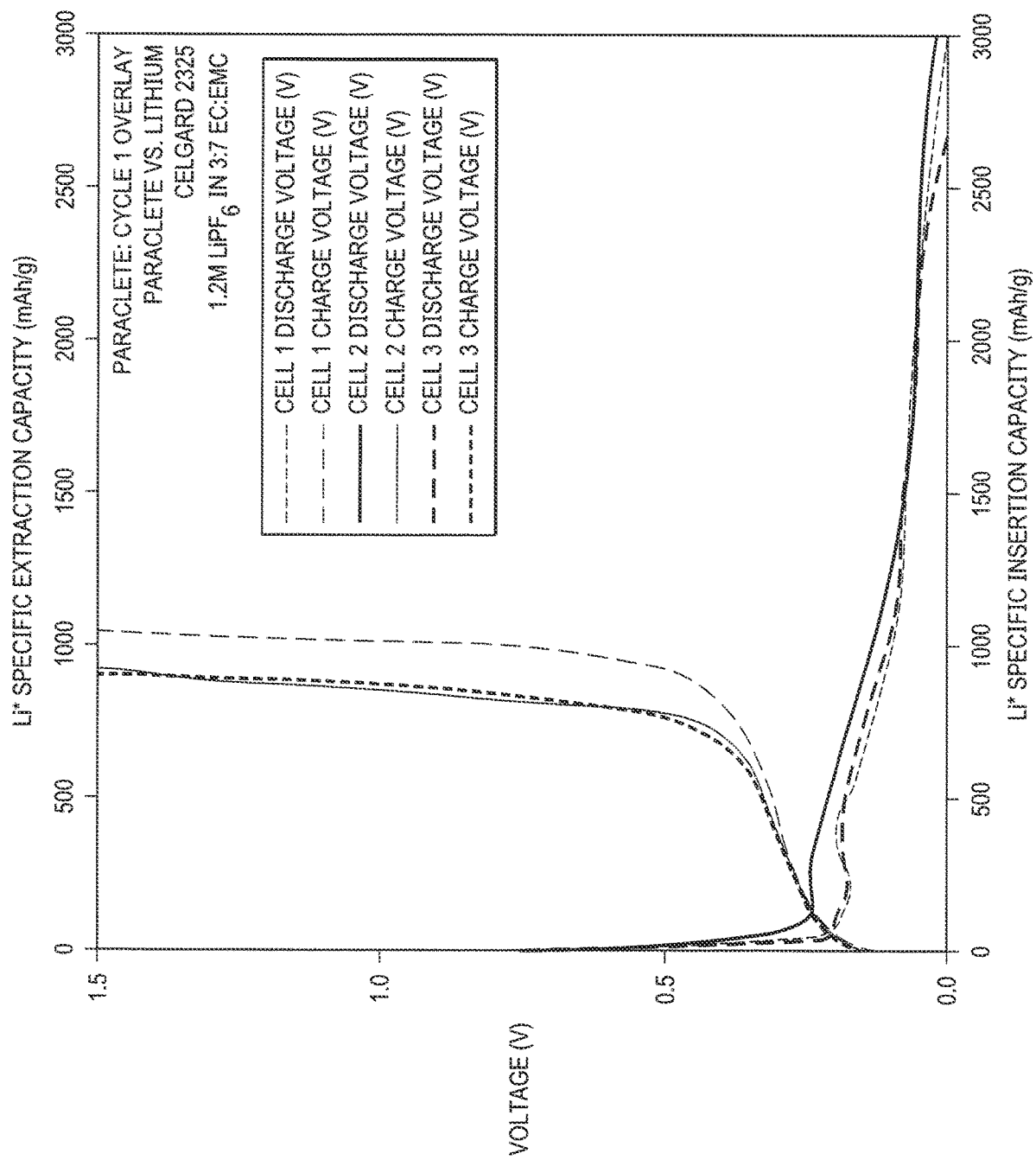
FIG. 8 is a graph of first cycle results for commercial silicon.
Figure 9:
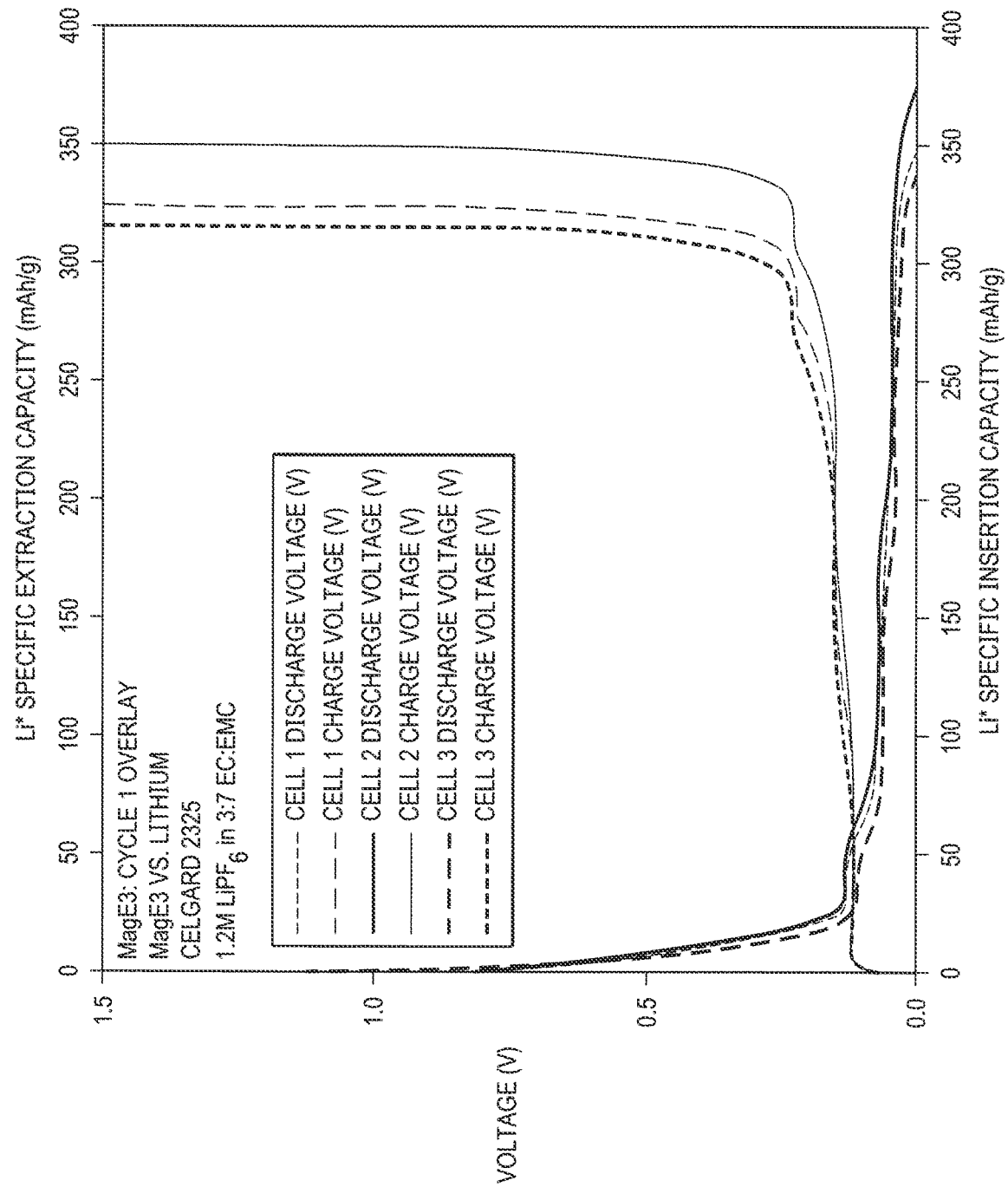
FIG. 9 is a graph of first cycle results for commercial graphite.
Figure 10:
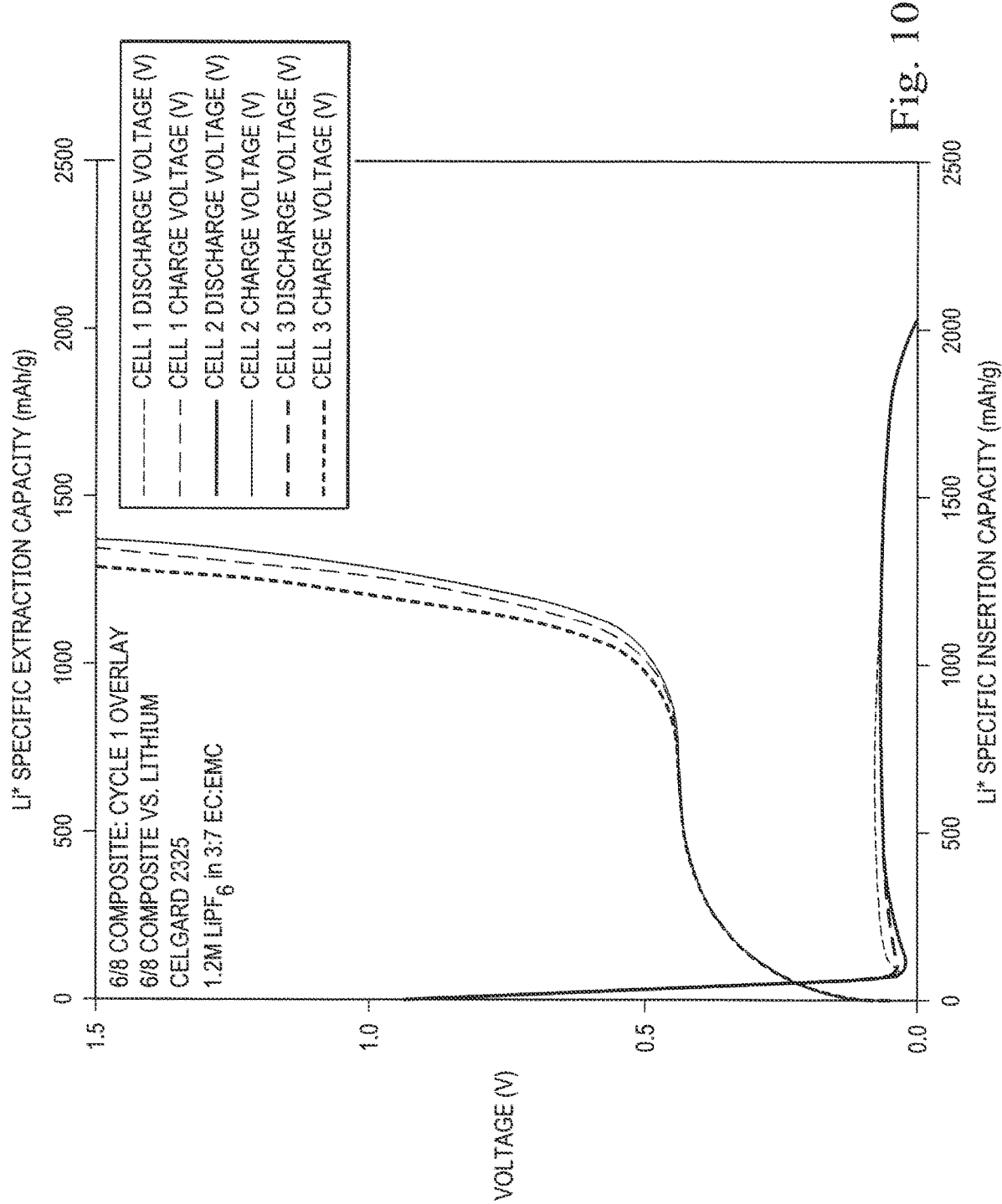
FIG. 10 is a graph of first cycle results for sample 1 of Examples 3 and 4 according to embodiments of the present disclosure.
Figure 11:
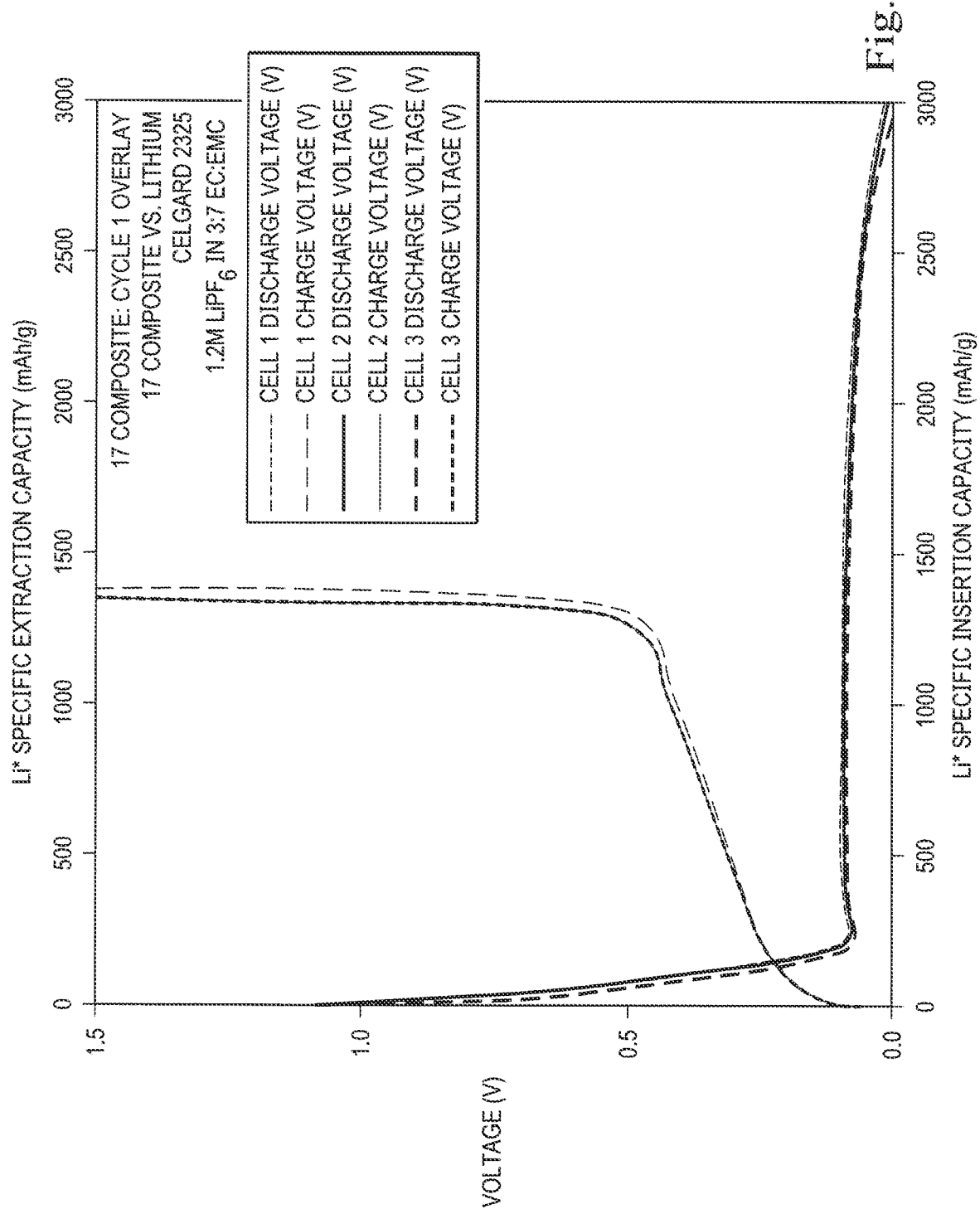
FIG. 11 is a graph of first cycle results for sample 5 of Examples 3 and 4 according to embodiments of the present disclosure.
Figure 12:
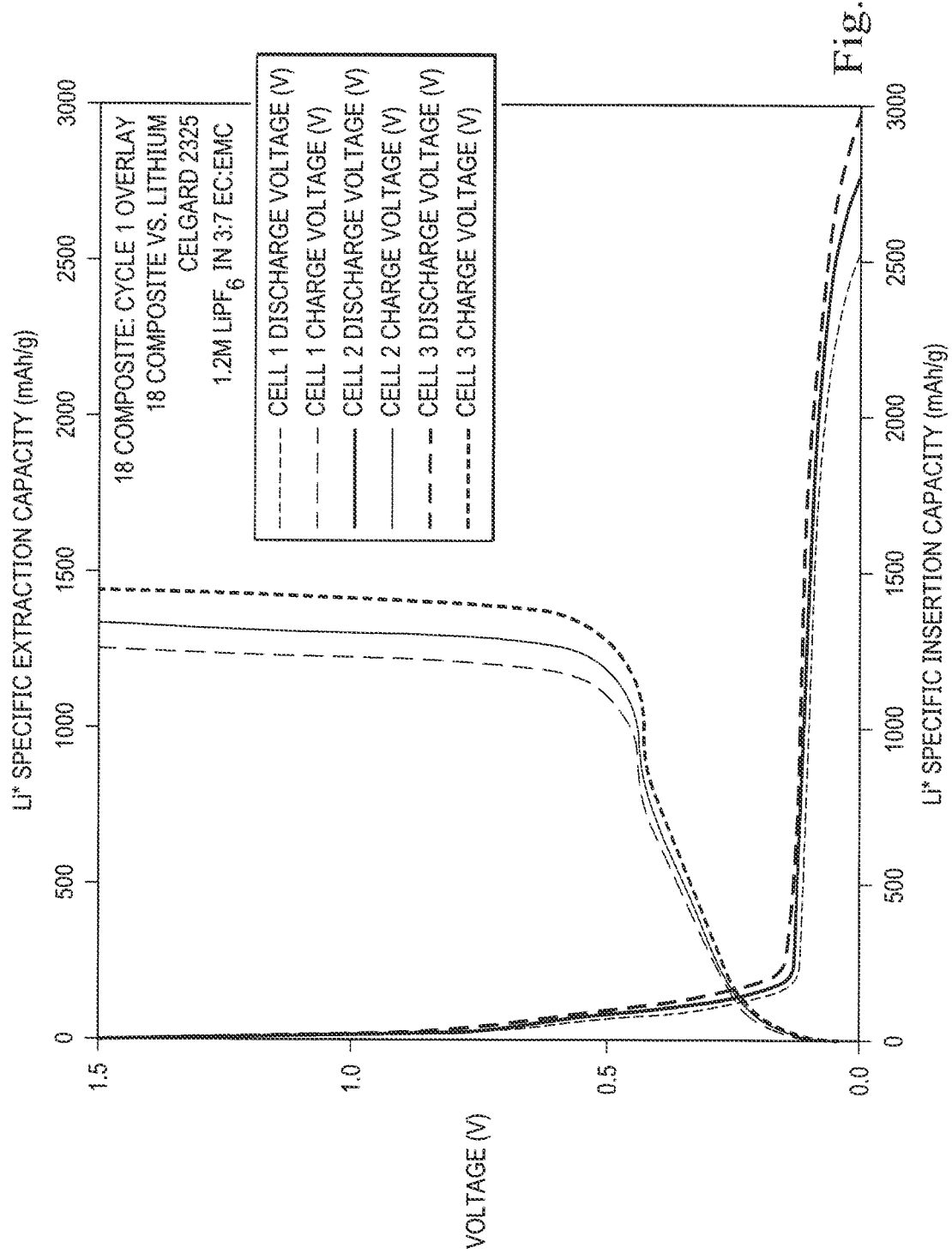
FIG. 12 is a graph of first cycle results for sample 2 of Examples 3 and 4 according to embodiments of the present disclosure.
Figure 13:
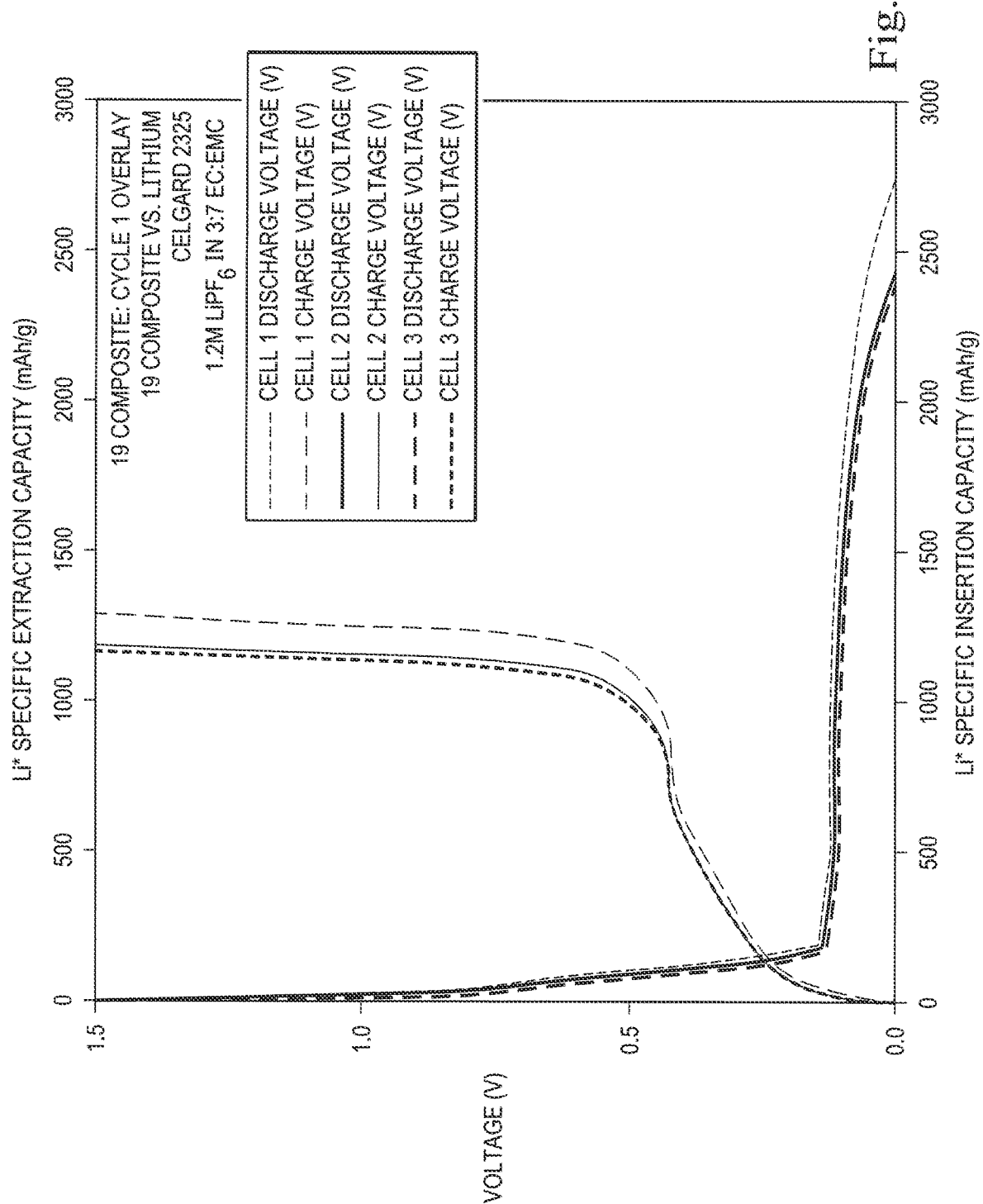
FIG. 13 is a graph of first cycle results for sample 10 of Examples 3 and 4 according to embodiments of the present disclosure.
Figure 14:
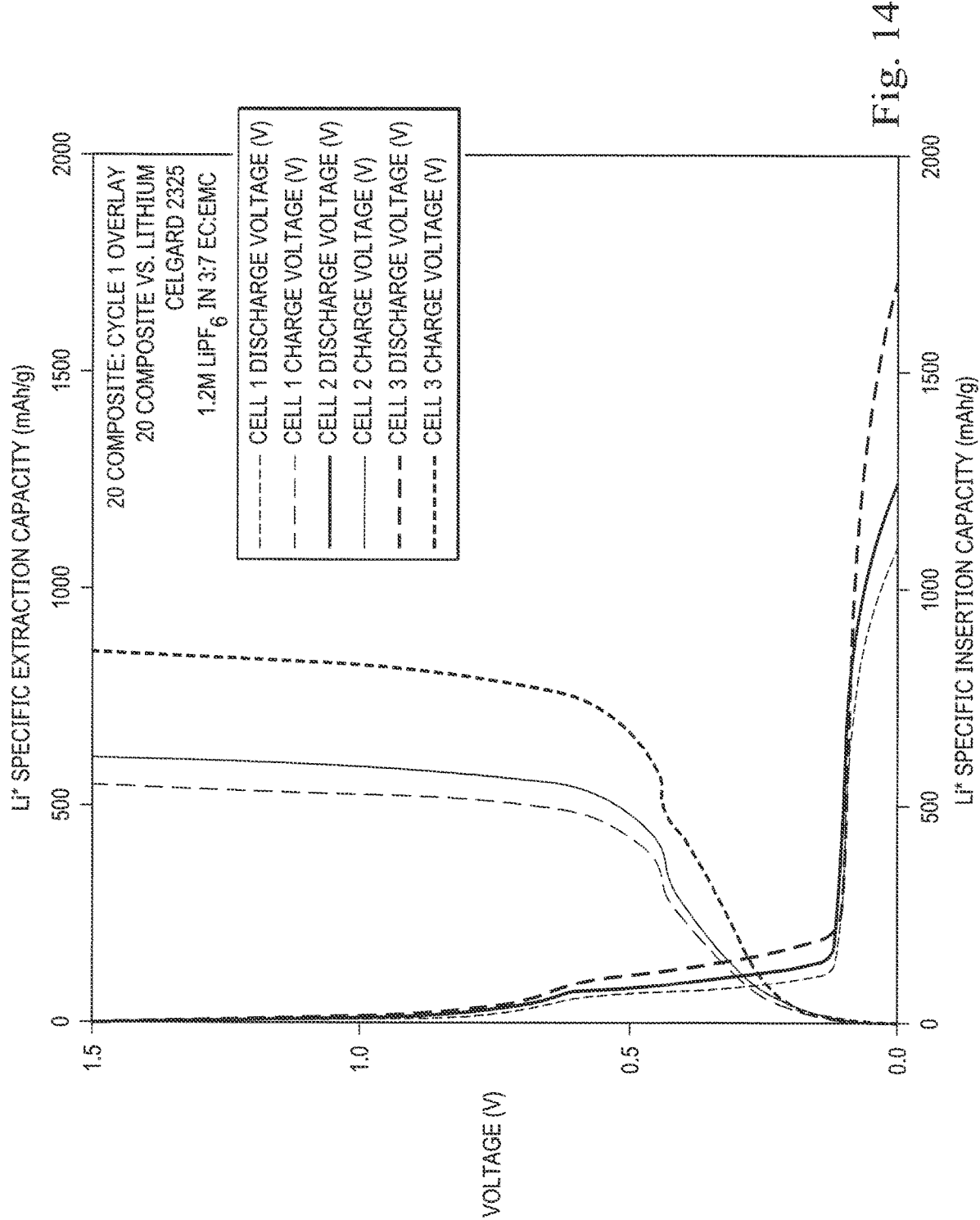
FIG. 14 is a graph of first cycle results for sample 11 of Examples 3 and 4 according to embodiments of the present disclosure.
Figure 15:
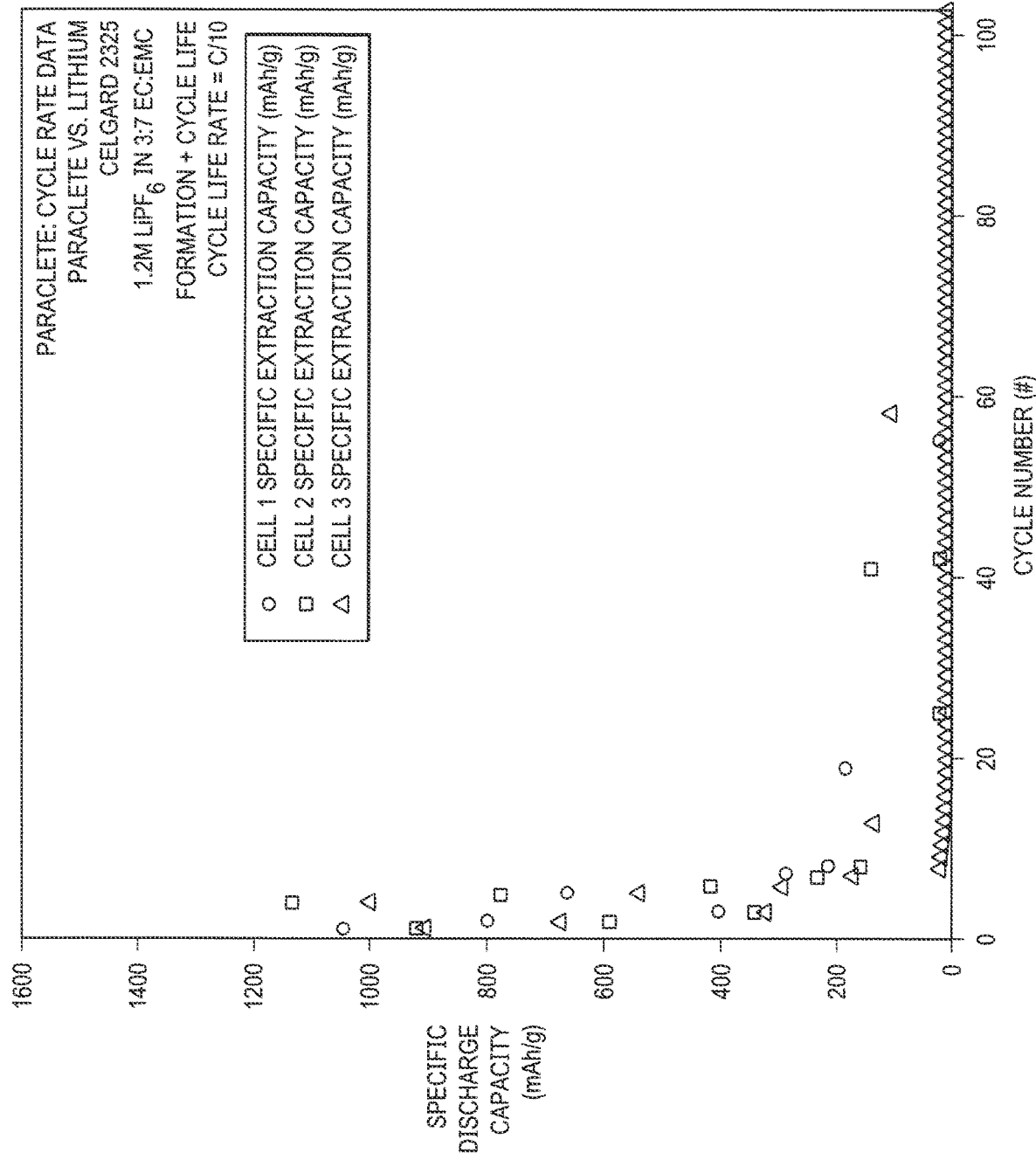
FIG. 15 is a graph of the capacity vs. cycle of commercial silicon.
Figure 16:
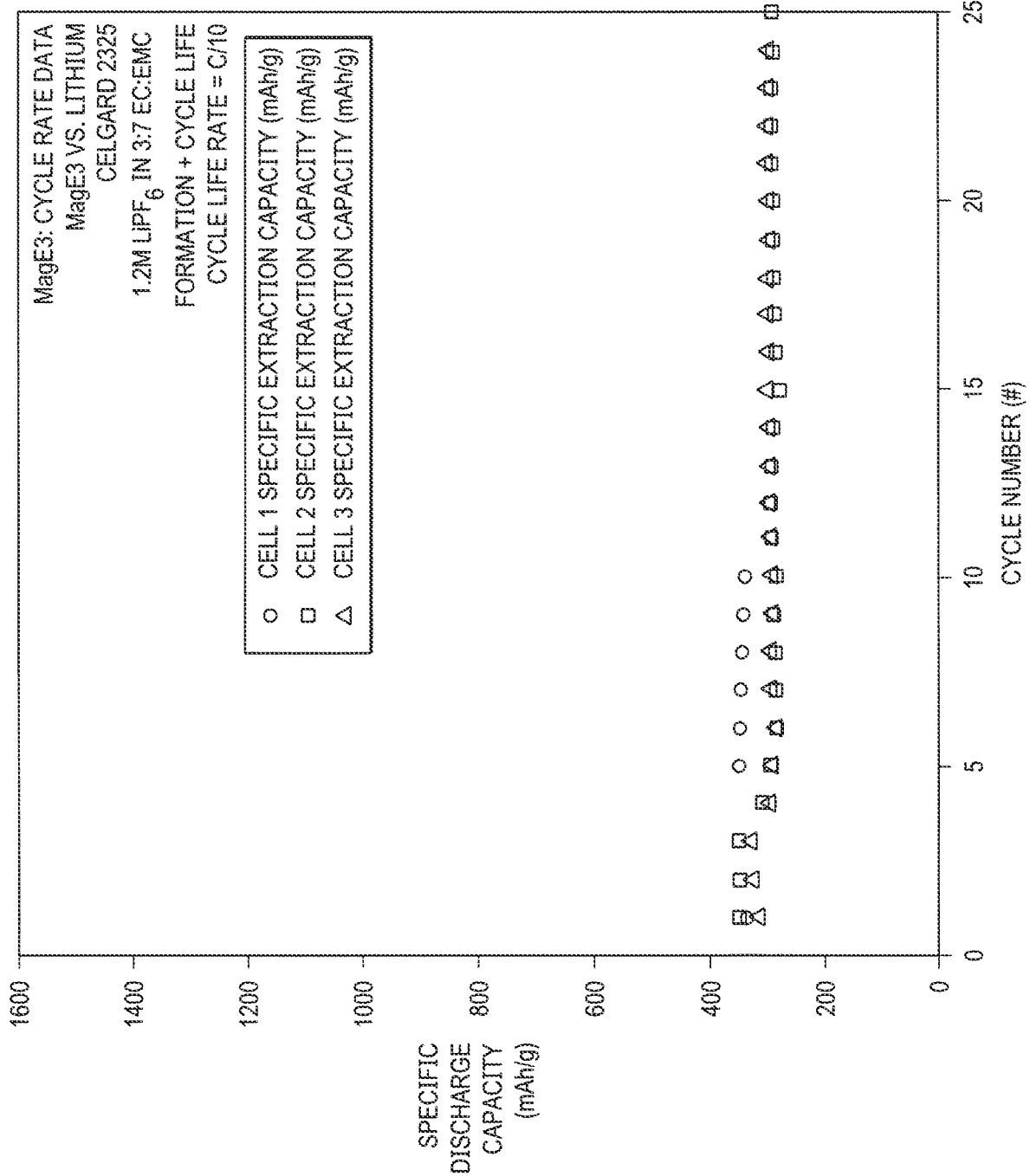
FIG. 16 is a graph of the capacity vs. cycle of commercial graphite.
Figure 17:
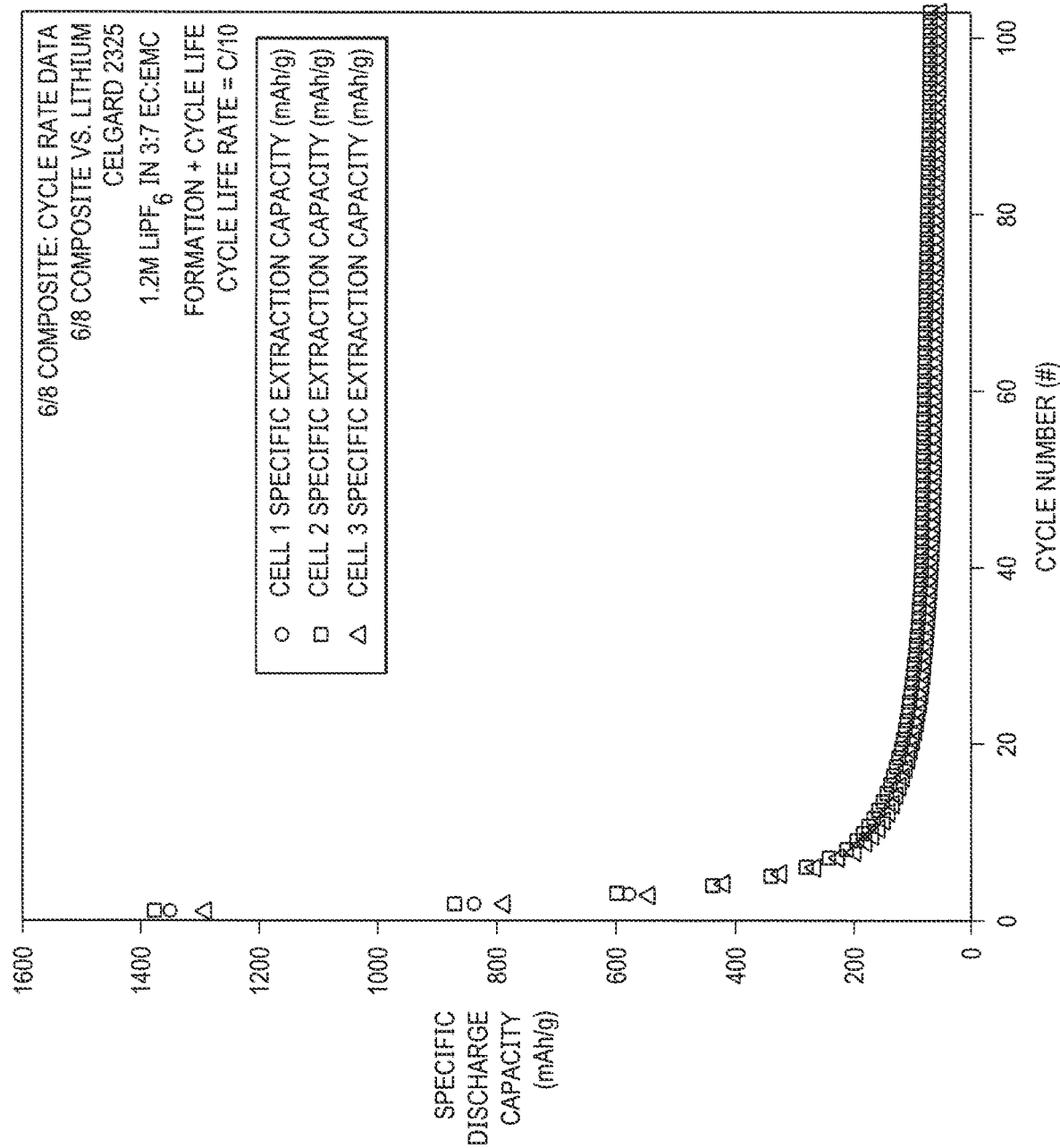
FIG. 17 is a graph of the capacity vs. cycle of sample 1 of Examples 3 and 4 according to embodiments of the present disclosure.
Figure 18:
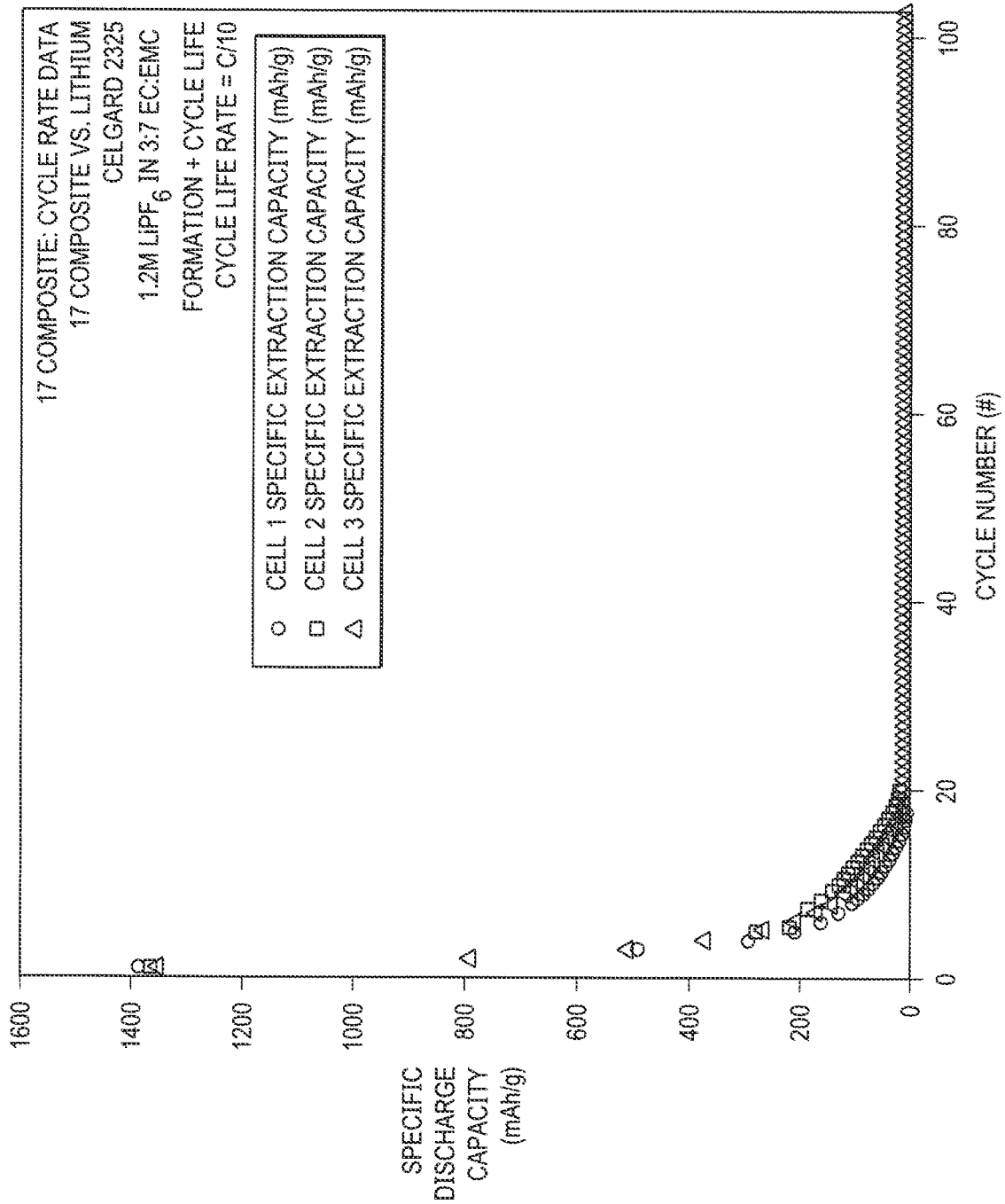
FIG. 18 is a graph of the capacity vs. cycle of sample 5 of Examples 3 and 4 according to embodiments of the present disclosure.
Figure 19:
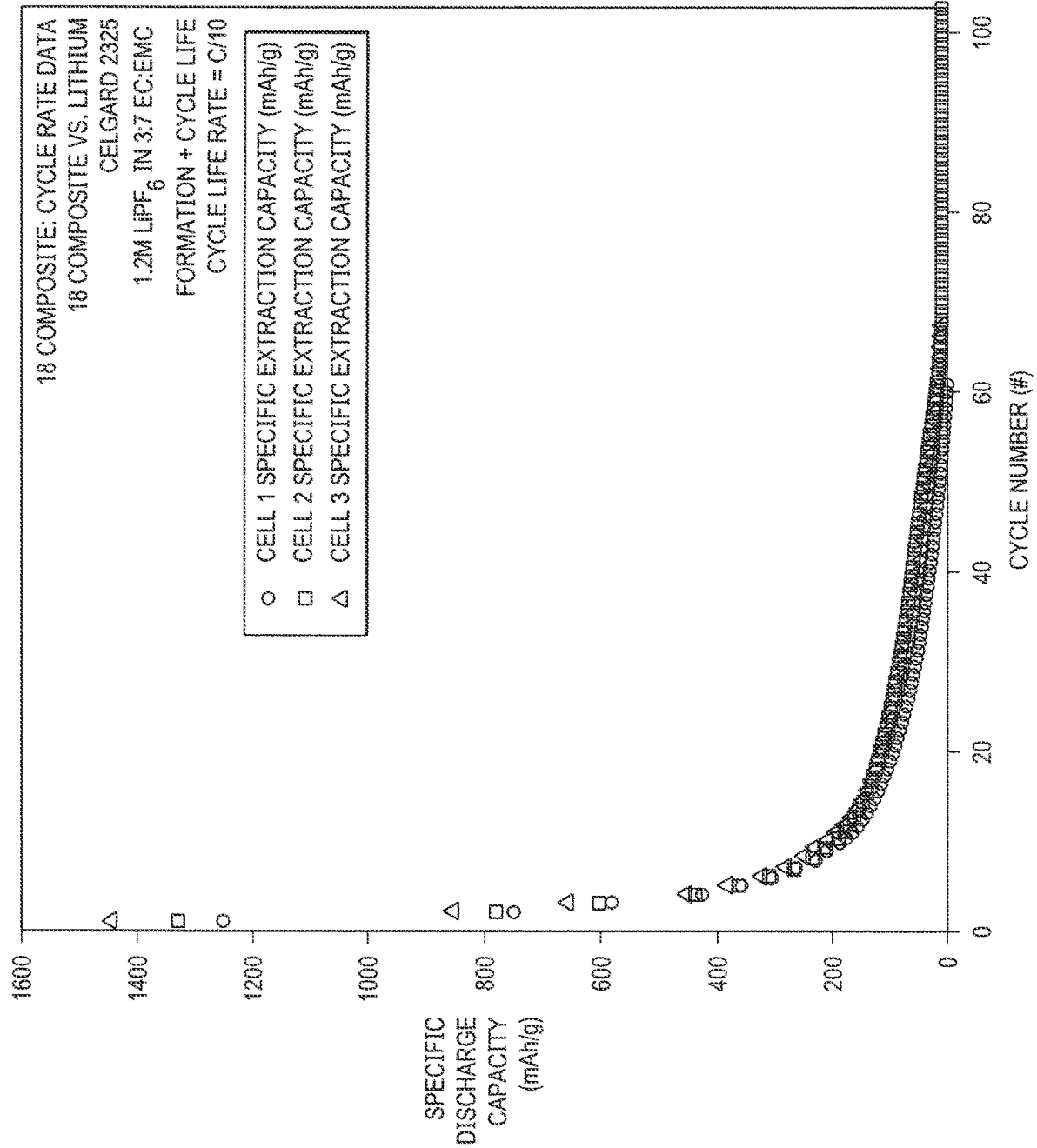
FIG. 19 is a graph of the capacity vs. cycle of sample 2 of Examples 3 and 4 according to embodiments of the present disclosure.
Figure 20:
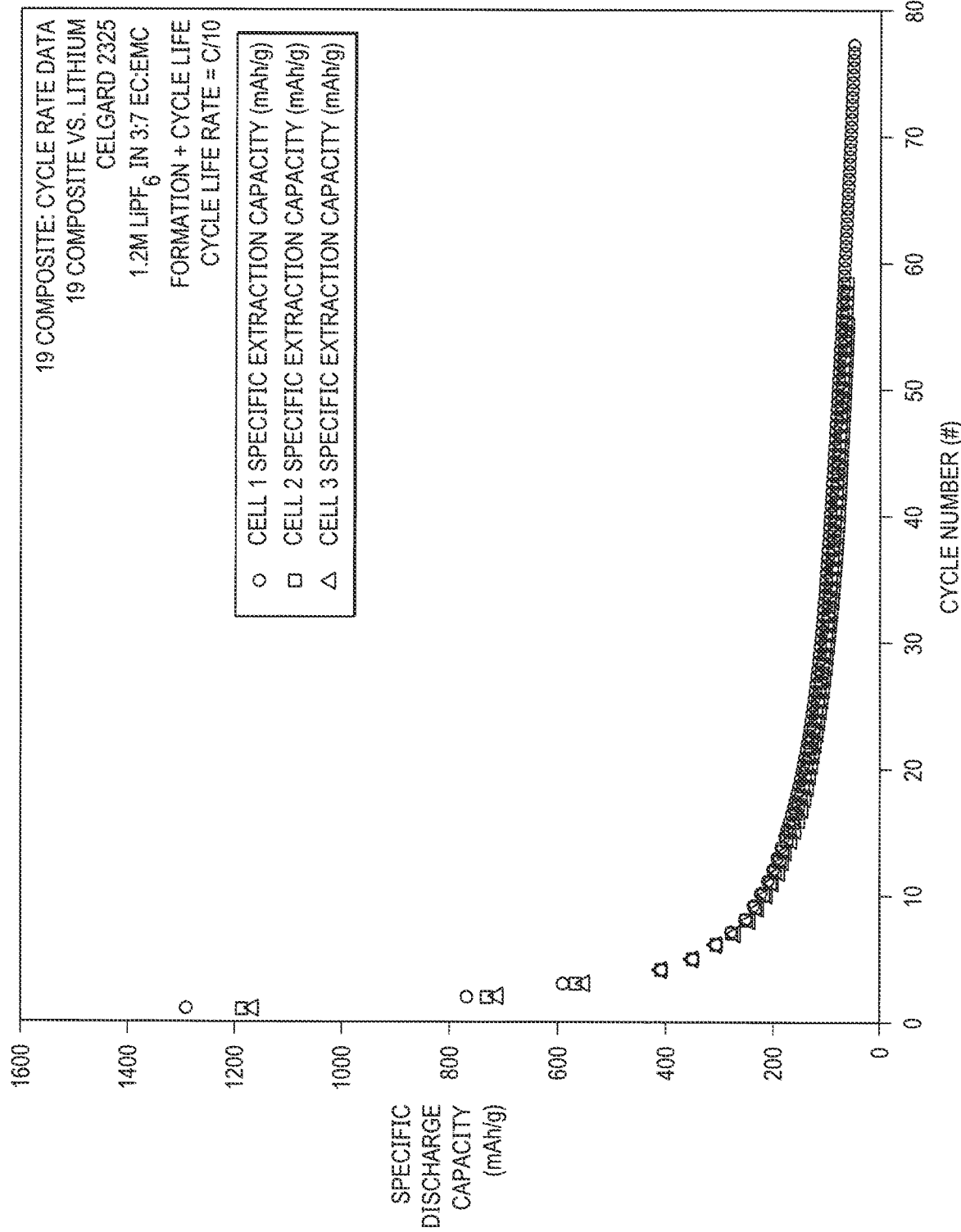
FIG. 20 is a graph of the capacity vs. cycle of sample 10 of Examples 3 and 4 according to embodiments of the present disclosure.
Figure 21:
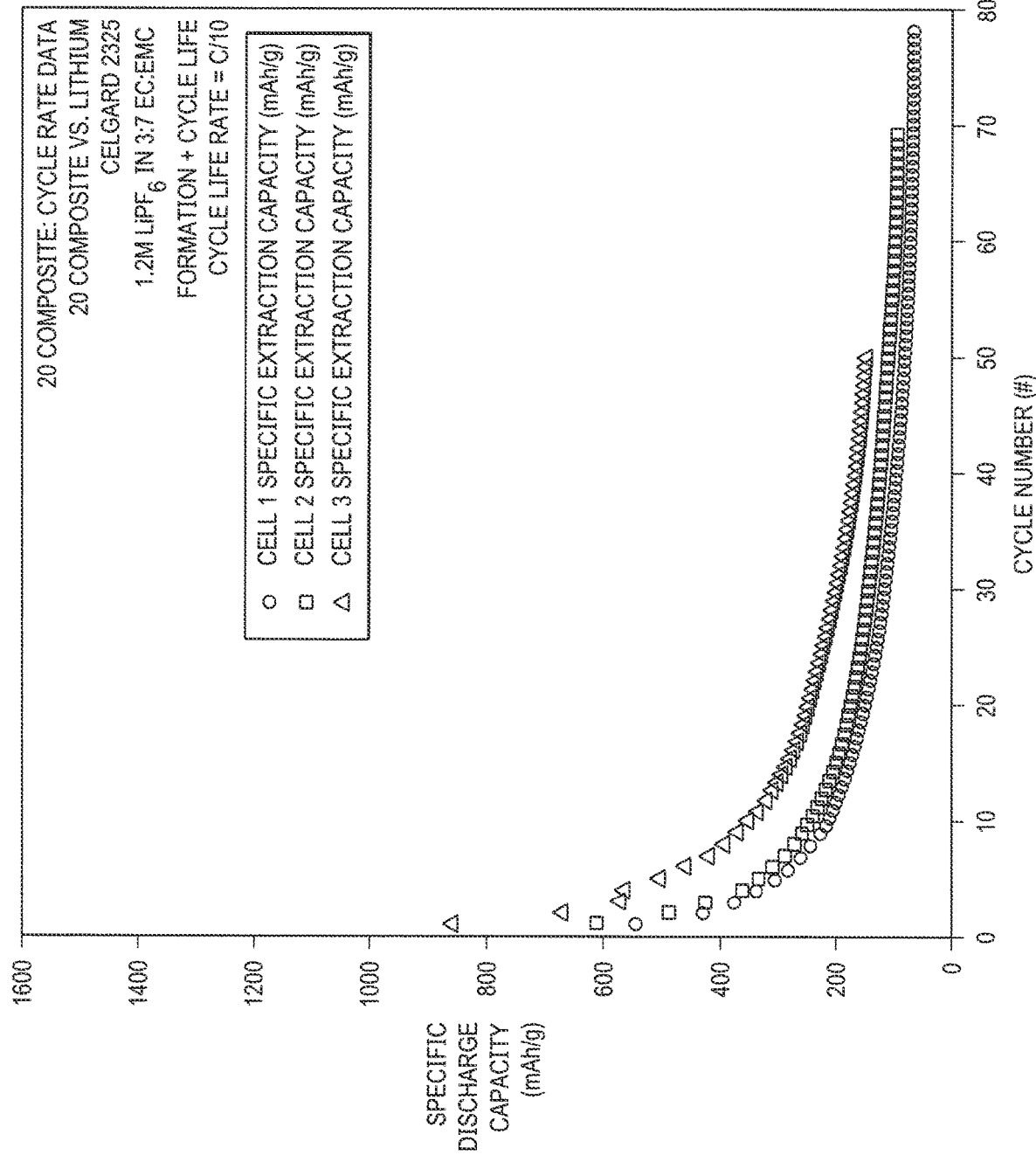
FIG. 21 is a graph of the capacity vs. cycle of sample 11 of Examples 3 and 4 according to embodiments of the present disclosure.

The resulting phases and morphologies are shown in the table below. FIG. 4 illustrates the effect of the $Mg/SiO_2$ mass ratio on the percentage of $SiO_2$ converted to silicon. At low and high ratios, the percent of $SiO_2$ converted is lower than when the ratio is 0.813 (approximately stoichiometric, meaning that there is one magnesium atom present per oxygen atom, which should result in full reduction of the silica-based precursor fiber and full oxidation of the magnesium). FIG. 5 illustrates the effect of the $Mg/SiO_2$ ratio on the surface area of the reduced silicon material. As the ratio increases, the surface area decreases. FIG. 6 illustrates the effect of the $Mg/SiO_2$ ratio on the median pore diameter. As the ratio increases, the median pore diameter increases. FIG. 7 illustrates the effect of the $Mg/SiO_2$ ratio on the pore volume of the reduced silica material. At low and high ratios, the porosity is lower than when the ratio is closer to 0.813 (stoichiometric).

TABLE 4

Results of Reduction Tests

| Sample | Si (wt %) | MgO (wt %) | $Mg_2Si$ (wt %) | $MgSiO_4$ (wt %) | Other (wt %) | Surface Area ($m^2/g$) | Pore Diameter (median, nm) | Porosity ($cm^3/g$) |
|---|---|---|---|---|---|---|---|---|
| 1 | 17.4 | 61.1 | 10.9 | 5.9 | 4.7 | 35 | 24 | 0.107 |
| 2 | 18.3 | 70.1 | 11.6 | 0.2 | N/A | 150.7 | 16 | 0.58 |
| 3 | 17.2 | 64.5 | 14.4 | 3.9 | N/A | 110 | 21 | 0.46 |
| 4 | 4.8 | 57.2 | 37.4 | 0.5 | N/A | 92.1 | 25.5 | 0.416 |
| 5 | 18.5 | 69.5 | 10.2 | 1.2 | N/A | 91.0 | 21 | 0.388 |

TABLE 4-continued

Results of Reduction Tests

| Sample | Si (wt %) | MgO (wt %) | $Mg_2Si$ (wt %) | $MgSiO_4$ (wt %) | Other (wt %) | Surface Area ($m^2/g$) | Pore Diameter (median, nm) | Porosity ($cm^3/g$) |
|---|---|---|---|---|---|---|---|---|
| 6 | 5.0 | 56.1 | 38.6 | 0 | N/A | 108.7 | 25 | 0.406 |
| 7 | 16.3 | 68.2 | 14.6 | 1.0 | N/A | 134.6 | 15.5 | 0.452 |
| 8 | 3.0 | 57.6 | 37.8 | 0 | N/A | 116.2 | 22 | 0.309 |
| 9 | 3.9 | 58.9 | 36.8 | 0 | N/A | 104.8 | 23 | 0.364 |
| 10 | 20.9 | 50.1 | 0 | 0 | 28.4 | 270 | 11.5 | 0.580 |
| 11 | 11.9 | 26.7 | 0 | 0 | 60.6 | 284 | 9.5 | 0.483 |

Since microstructure of the reduced silica fiber is likely linked to the electrochemical and cycle performance of the material in a cell, it is desirable to be able to control the final microstructure of the reduced fiber. Hence, it is important to preserve the microstructural features of the initial silica-based precursor fiber (as created by leaching, polymer templating or other process), as well as possibly enhancing these features by creating additional pore volume and surface area. Controlling the reduction process is critical to creating an optimal microstructure.

Samples 1 and 5 were reduced under similar conditions (2 and 3 hours, respectively, at 700° C.), but at differing heating rates. This gave a similar phase structure (Si, MgO, $Mg_2Si$, and $MgSiO_4$), but drastically different morphological characteristics. Sample 1, which was heated at 5° C./min shows a very low surface area (35 $m^2/g$), a relatively coarse median pore diameter (24 nm) and low porosity of 0.107 $cm^3/g$. In contrast, sample 5 with a lower heating rate shows a much more porous structure with a surface area of 91 $m^2/g$, 21 nm median pore diameter and 0.388 $cm^3/g$, which is over 3 times the amount of porosity. XRD indicates that silicon crystal sizes in samples 1 and 5 were on the order of 132 nm and 31 nm, respectively.

This effect is believed to be due to the exothermic nature of the reduction reaction. A rapid heating rate (5° C./min) drives the reaction to occur over a short time/temperature period. As the reaction quickly drives to completion, heat from the reaction may build up in the reactor and cause the reactor temperature to increase well above the ambient environment. This can drive sintering, grain growth and other microstructural consolidation in the sample. A lower heating rate (1° C./min) will allow the reaction to occur over a longer time period, which in turn may allow the heat of reaction to dissipate into the environment, thus maintaining a lower temperature in the reactor and suppressing temperature-driven microstructural changes.

In another comparative study, samples 2, 9, 10, and 11 all underwent the same heat treatment cycle, but with differing ratios of Mg to $SiO_2$. Sample 2 had a mass ratio of Mg to $SiO_2$ (Mg/$SiO_2$) of 0.813, which is stoichiometric for complete removal of oxygen from $SiO_2$. Sample 9 had a ratio of 1.220, which contains 50% excess MgO relative to that needed to completely reduce the $SiO_2$. Sample 10 had a ratio of 0.610, which is 25% lean relative to the amount needed to fully reduce the $SiO_2$ (so only 75% of the oxygen atoms should be removed) and sample 11, with a ratio of 0.405, contains only half the Mg needed to fully reduce the $SiO_2$. As can be seen, the Mg-rich material had the smallest values of surface area and porosity of this set, as well as the coarsest pore diameter. Surface area shows a progressive increase as the Mg content becomes leaner, as illustrated in FIG. 5.

Example 4

Half-Cell Testing of Certain Samples of Example 3

While not wishing to be bound by theory, it is believed that a high pore volume is beneficial to the performance of an anode. As silicon becomes progressively lithiated, it expands to levels up to 3.5 times its unlithiated volume. This volume expansion must be accommodated within the negative electrode and the cell design. As can be seen from the data, cells constructed from commercial silicon, which exists as particles and agglomerates ranging from 0.1-1.0 microns in diameter, very quickly lose all capacity. This is believed to be due to the repeated expansion and contraction of the silicon distorting the electrode coating and causing loss of electrical conductivity within the electrode, causing it to become inaccessible to charging or discharging current. By providing internal porosity within the silicon-based fibers, an internal volume is created which can accommodate at least a portion of that expansion without disrupting the fiber exterior or the electrode structure.

Selected samples were made into anodes and underwent half-cell testing as described in Example 2 with the exception that the first 3 cycles were conducted at C/20 and subsequent cycles as before, at C/10.

TABLE 5

Results of Half-Cell Testing

| Sample | Cycle 1 Insertion Capacity (mAh/g) | Cycle 1 Extraction Capacity (mAh/g) | Coulombic Efficiency (%) | Capacity Ratio C3/C1 | Capacity Ratio C10/C1 | Capacity Ratio C40/C1 |
|---|---|---|---|---|---|---|
| Graphite | 351.3 | 330.0 | 93.9 | 1 | 0.957 | NM |
| Commercial Silicon | 2907.0 | 952.0 | 32.7 | 0.377 | 0 | 0 |
| 1 | 2022.0 | 1333.0 | 65.9 | 0.416 | 0.116 | 0.030 |
| 5 | 2990.3 | 1362.3 | 45.6 | 0.367 | 0.073 | 0 |
| 2 | 2737.6 | 1344.3 | 49.1 | 0.456 | 0.149 | 0.037 |

TABLE 5-continued

Results of Half-Cell Testing

| Sample | Cycle 1 Insertion Capacity (mAh/g) | Cycle 1 Extraction Capacity (mAh/g) | Coulombic Efficiency (%) | Capacity Ratio C3/C1 | Capacity Ratio C10/C1 | Capacity Ratio C40/C1 |
|---|---|---|---|---|---|---|
| 10 | 2483.3 | 1207.7 | 48.6 | 0.464 | 0.178 | 0.075 |
| 11 | 1326.7 | 670.3 | 50.5 | 0.674 | 0.406 | 0.191 |

NM = not measured

In this dataset, insertion capacity is seen to be highest in the commercial silicon samples, with lower values in Samples 10 and 11, due to the smaller amounts of Mg used in these reductions. Samples 10 and 11 are not fully reduced, and thus likely contain a combination of Si (3500 mAh/g), SiO (1710 mAh/g) and $SiO_2$.

Cycle life, as indicated by capacity ratios, is highest in the graphite, which is known to have long-term stability. The commercial silicon has lost all capacity after 10 cycles. The silicon-based fiber material, however, retains cycle life through 10 and 40 cycles, with samples 10 and 11 having the highest capacity retention. Referring to the earlier discussion of the potential role of internal porosity in accommodating expansion, it is also possible that samples 10 and 11 experience reduced expansion due to the presence of oxide material, and thus expand at a level which can be more readily accommodated by the existing porosity.

Various graphs of the first cycle results are provided in FIGS. 8-14. FIGS. 8-14 show the amount of lithium inserted into and extracted from the anodes as they are cycled between 0.01 and 1.5 volts. The lower curves and lower scale show the amount of lithium inserted into the anode or "insertion capacity." The upper curves show the amount of lithium extracted from the anode or "extraction capacity." Cells were tested in triplicate, so there are three (3) sets of curves for each test.

Various graphs of cycle life are provided in FIGS. 15-21. FIGS. 15-21 show the extraction (or discharge) capacity of the half cells and how it varies as the cells are progressively cycled. Each data point shows the extraction capacity for the given test. The test was conducted in triplicate so there are three separate datasets represented in each graph.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A battery comprising:
an anode comprising a porous reduced silica fiber comprising $SiO_x$ where x=0–2 and silicon, the porous reduced silica fiber having a diameter of about 0.1 to about 20 microns, a surface area of about 5 $m^2/g$ to about 400 $m^2/g$, and a porosity of about 0.01 $cm^3/g$ to about 1.5 $cm^3/g$; and
a cathode comprising a mixed metal oxide.

2. The battery of claim 1, wherein the porous reduced silica fiber comprises at least 20 weight percent silicon.

3. The battery of claim 1, wherein the porous reduced silica fiber comprises a carbon coating.

4. The battery of claim 1, wherein the mixed metal oxide comprises an oxide of lithium and at least one of aluminum, cobalt, iron, manganese, nickel, titanium, and vanadium.

5. The battery of claim 1, wherein the mixed metal oxide comprises at least one of $LiCoO_2$, $LiNi_{0.33}Mn_{0.33}Co_{0.33}O_2$, $LiNi_{0.8}Co_{0.15}Al_{0.05}O_2$, $LiMnO_4$, $LiFePO_4$, $LiMn_2O_4$, $Li_2MnO_3$, and $Li_4Ti_5O_{12}$.

6. The battery of claim 1, wherein the porous reduced silica fiber has a diameter of about 2 to about 15 microns.

7. The battery of claim 1, wherein the porous reduced silica fiber has a surface area of about 30 $m^2/g$ to about 300 $m^2/g$ and a porosity of about 0.1 $cm^3/g$ to about 0.7 $cm^3/g$.

8. The battery of claim 1, wherein the porous reduced silica fiber has a median pore diameter of about 1 nm to about 90 nm and pore diameters ranging from about 0.1 nm to about 150 nm.

9. The battery of claim 1, wherein the porous reduced silica fiber is formed by magnesiothermic reduction.

10. The battery of claim 1, wherein the cathode comprises fibers formed of the mixed metal oxide.

11. The battery of claim 1, further comprising an electrolyte comprising a lithium salt and a solvent.

12. The battery of claim 11, wherein the lithium salt comprising lithium hexafluorophosphate ($LiPF_6$), lithium tetrafluoroborate ($LiBF_4$), lithium perchlorate ($LiClO_4$), or combinations thereof.

13. The battery of claim 12, wherein the solvent comprises ethylene carbonate, dimethyl carbonate, diethyl carbonate, or combinations thereof.

14. The battery of claim 1, wherein the anode further comprises graphite, a silicon alloy, tin oxide, or combinations thereof.

15. The battery of claim 1, wherein the anode further comprises carbon black, carbon nanotubes, or a combination thereof.

16. The battery of claim 1, wherein at least one of the anode or the cathode comprises a binder.

17. The battery of claim 1, wherein the battery is a pouch cell or a coin cell.

18. The battery of claim 1, wherein the battery is a lithium ion battery comprising rolled sheets of the cathode, the anode, and a separator.

* * * * *